(12) United States Patent
Imai et al.

(10) Patent No.: US 7,872,435 B2
(45) Date of Patent: Jan. 18, 2011

(54) MOTOR CONTROL APPARATUS

(75) Inventors: Nobuyuki Imai, Utsunomiya (JP);
Yoshinari Murayama, Utsunomiya (JP);
Junji Inoue, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 450 days.

(21) Appl. No.: 12/107,358

(22) Filed: Apr. 22, 2008

(65) Prior Publication Data

US 2008/0265831 A1  Oct. 30, 2008

(30) Foreign Application Priority Data

Apr. 24, 2007  (JP) ............................. 2007-114047

(51) Int. Cl.
*G05B 11/28* (2006.01)
(52) U.S. Cl. ........................ 318/599; 318/811; 388/804; 388/812
(58) Field of Classification Search ................. 318/599, 318/811, 800, 461, 632; 388/800, 804, 811, 388/812–814, 805

See application file for complete search history.

(56) References Cited

U.S. PATENT DOCUMENTS 5,532,569 A * 7/1996 Tanamachi et al. .......... 318/802
7,166,975 B2 * 1/2007 Mori et al. .............. 318/400.36
2005/0201129 A1 * 9/2005 Nakatsugawa et al. ...... 363/131
2006/0184213 A1 * 8/2006 Griffith ........................ 607/60

FOREIGN PATENT DOCUMENTS

JP  05-161364  6/1993
JP  07-163189  6/1995

* cited by examiner

*Primary Examiner*—Rina I Duda
(74) *Attorney, Agent, or Firm*—Arent Fox LLP

(57) ABSTRACT

A motor control apparatus provided with an inverter for successively commutating the current to a motor using a PWM signal; a PWM signal generating device for generating the PWM signal using a carrier signal; a rotational state quantity sensor for detecting a rotational state quantity; a phase difference detecting device for detecting the phase difference between the carrier signal and the rotational period based on the rotational state quantity; a frequency setting device for setting a frequency of the carrier signal to a value in accordance with a multiplier for one period in terms of electrical angle of the rotational period of the motor, when the rotational frequency is equal to or greater than a specified frequency and the phase difference is equal to or less than a specified value; and a synchronizing device for synchronizing a control period of the carrier signal to the rotational period.

12 Claims, 17 Drawing Sheets

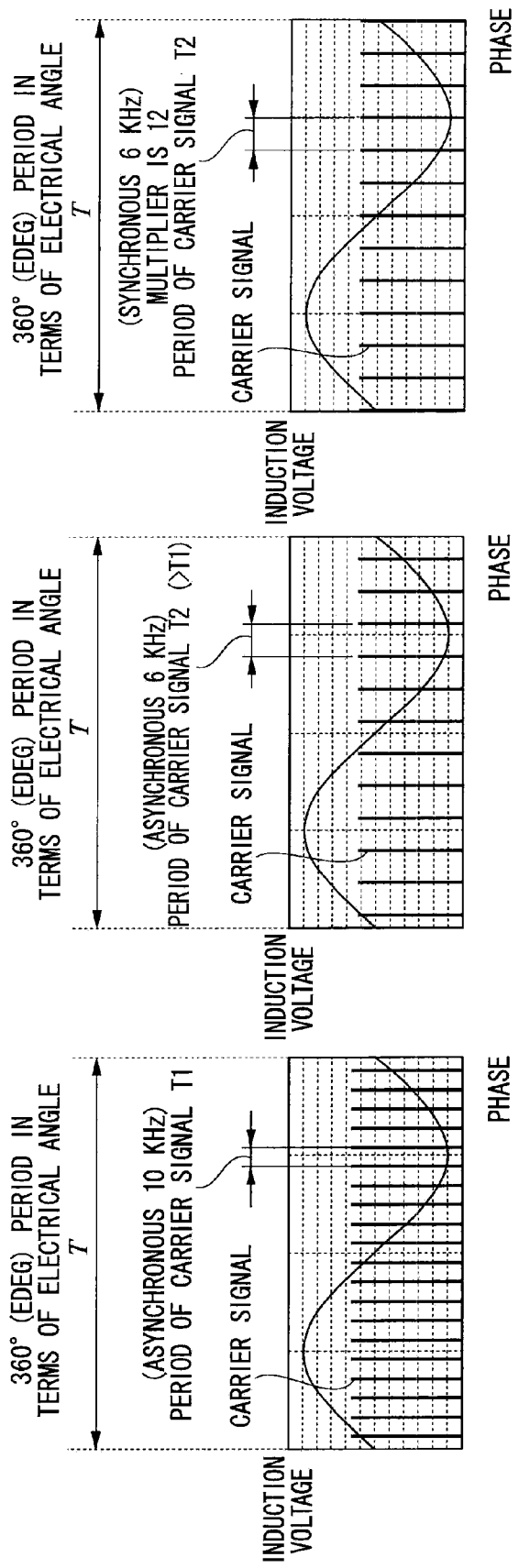

MOTOR CONTROL APPARATUS

BACKGROUND OF THE INVENTION

1. Field of the Invention

The present invention relates to a motor control apparatus.

Priority is claimed on Japanese Patent Application No. 2007-114047, filed Apr. 24, 2007, the content of which is incorporated herein by reference.

2. Description of Related Art

There has been a desire for higher frequency motors in order to increase motor output while decreasing motor size.

By increasing the pairs of poles of a motor, for example, there is a decrease in the circumferential width of the teeth of the stator and an accompanying reduction in the width of the back yoke that supports the teeth. As a result, the control frequency of the motor becomes higher accompanying the reduction in motor size. In addition, the torque that a motor is capable of outputting increases and decreases in accordance with motor size. Thus, by increasing the revolutions that can be achieved, it is possible to increase output (i.e., product of torque and revolutions) while decreasing motor size.

However, when operating a motor at high frequency, the stability of the control system deteriorates due to errors in the detection of the rotation phase and higher harmonic components in the electrical current passing through the motor. There are therefore conventionally known control apparatuses for correcting detection errors of rotation phase or suppressing the higher harmonic components included in the electrical current passing through the motor (see Japanese Unexamined Patent Application, First Publication No. 9-308300 and Japanese Unexamined Patent Application, First Publication No. 2001-298992, for example).

In the motors according to the aforementioned conventional technology, the induction voltage of the motor includes various higher harmonic waves, and the current flowing through the motor includes higher harmonic components. For this reason, the current values sampled at each control period during current feedback control and other such sequential control processing vary at a period corresponding to the least common multiple of the control period and the period of the higher harmonic components. As a result, when the control period approaches the period of the higher harmonic components, sub-harmonic variation and regular off-set occurs, leading to a deterioration in the control system.

Due to errors of the detection system or the like, a resolver or other such angle sensor, which outputs a pulse in accordance with the rotation angle of the motor, will generates an error of a 360° (edeg) or 180° (edeg) period in terms of electrical angle. Thus, when the control period approaches the 360° (edeg) period in terms of electrical angle, sub-harmonic variation and regular off-set occur, problematically leading to a deterioration in the control system.

In a resolver and R/D (resolver/digital) converter, for example, feedback control is executed so that θ=Φ for the signal shown by the following equation (1), where E sin ωt is the exciting voltage, K is a voltage transformation ratio, θ is the rotation angle of the resolver, and Φ is the output counter value.

Here, when a suitable off-set α is applied to the detection signal of the resolver, then, as shown by the following equations (2) and (3), an error (θ−Φ) of a 360° (edeg) period in terms of electrical angle is generated.

Moreover, when a reasonable deviation β is generated in the amplitude of the detected signal of the resolver, then, as shown by the following equations (4) through (6), an error (θ−Φ) of a 180° (edeg) period in terms of electrical angle is generated.

$$KE \cdot \sin\omega t \cdot \sin\theta \cdot \cos\Phi - KE \cdot \sin\omega t \cdot \cos\theta \cdot \sin\Phi = \quad \text{[Equation 1]}$$
$$KE \cdot \sin\omega t \cdot \sin(\theta - \Phi)$$

$$(KE \cdot \sin\omega t + \alpha) \cdot \sin\theta \cdot \cos\Phi - KE \cdot \sin\omega t \cdot \cos\theta \cdot \sin\Phi = \quad \text{[Equation 2]}$$
$$KE \cdot \sin\omega t \cdot \sin(\theta - \Phi) + \alpha \cdot \cos\Phi = 0$$

$$(\theta - \Phi) \approx -\alpha \cdot \cos\Phi \quad \text{[Equation 3]}$$

$$(1 + \beta)KE \cdot \sin\omega t \cdot \sin\theta \cdot \cos\Phi - KE \cdot \sin\omega t \cdot \cos\theta \cdot \sin\Phi = \quad \text{[Equation 4]}$$
$$KE \cdot \sin\omega t \cdot \{\sin(\theta - \Phi) + \beta\sin\theta \cdot \cos\Phi\} =$$
$$KE \cdot \sin\omega t \cdot \left\{\sin(\theta - \Phi) + \beta\frac{\sin(\theta + \Phi) + \sin(\theta - \Phi)}{2}\right\} = 0$$

$$\sin(\theta - \Phi) = -\frac{\beta}{2 + \beta}\sin(\theta + \Phi) = 0 \quad \text{[Equation 5]}$$

$$\theta - \Phi \approx -\frac{\beta}{2 + \beta} \cdot \sin 2\Phi \quad \text{[Equation 6]}$$

SUMMARY OF THE INVENTION

The present invention was conceived in view of the above-described circumstances and has as its objective the provision of a motor control apparatus for which it is possible to suitably increase motor output while decreasing motor size.

The invention employs the following means so as to accomplish the above-mentioned object.

The motor control apparatus according to a first aspect of the present invention is provided with an inverter (PDU 12 in an embodiment, for example) for successively commutating the current to a motor using a pulse width modulation signal; a pulse width modulation signal generating device (PWM signal generator 27 in an embodiment, for example) for generating the pulse width modulation signal using a carrier signal of variable frequency and phase; a rotational state quantity sensor (position sensor 15 in an embodiment, for example) for detecting a rotational state quantity relating to the rotational period of the motor; a phase difference detecting device (synchronous controller 31, steps S21 to S23 in an embodiment, for example) for detecting the phase difference between the carrier signal and the rotational period based on the rotational state quantity; a frequency setting device (synchronous controller 31 and step 36 in an embodiment, for example) for setting a frequency of the carrier signal to the value in accordance with a multiplier for one period in terms of electrical angle of a rotational period of the motor, based on a multiplier which changes in accordance with revolutions of the motor in the case where the rotational frequency of the motor is equal to or greater than a specified frequency and the phase difference is equal to or less than a specified value, and a synchronizing device (synchronous controller 31 and step S36 in an embodiment, for example) for synchronizing a control period of the carrier signal to the rotational period of the motor.

Further, in the motor control apparatus according to a second aspect of the present invention, the frequency setting device and the synchronizing device may be capable of setting a specific phase difference between the control period and the rotational period of the motor.

The motor control apparatus according to a third aspect of the present invention may be provided with a current sensor (current sensor 14 in an embodiment, for example) capable of detecting the current flowing through the motor in accordance with the control period; and a current controlling device (step S33 in an embodiment, for example) for carrying out the current control of the motor based on the average value of the current values detected by the current sensor over a specific period relating to the rotational period of the motor.

In the motor control apparatus according to a forth aspect of the present invention, the rotational state quantity sensor may output a signal synchronized with the rotational period of the motor.

The motor control apparatus according to a fifth aspect of the present invention may be provided with a prohibiting device (synchronous controller 31 and steps S04 to S05 in an embodiment for example) for prohibiting synchronization of the control period with the rotational period of the motor by the synchronizing device when the control period is less than a specific lower limit period and the multiplier is less than a specific lower limit value.

In the motor control apparatus according to a sixth aspect of the present invention, the frequency setting device may increase the multiplier when the control period is equal to or greater than a specific upper limit period, and decreases the multiplier when the control period is less then a specific lower limit period and the multiplier is equal to or greater than a specific lower limit value.

In the motor control apparatus according to a seventh aspect of the present invention, the frequency setting device may set the period Tc of the carrier signal according to the equation $(Tc=(T-k \times \Delta t)/N)$, where T is one period in terms of electrical angle of the rotational period of the motor, k is a specified coefficient which is equal to or less than one but greater than zero, $\Delta t$ is the phase difference, and N is the multiplier.

In the motor control apparatus according to an eighth aspect of the present invention, the rotational state quantity sensor may be provided with an angle sensor (position sensor 15 in an embodiment, for example) for outputting a pulse in accordance with the rotation angle of the motor, and the motor control apparatus may be provided with an approximating device (synchronous controller 31 in an embodiment, for example) which estimates an estimated rotational period of the motor by assuming that the interval between adjacent pulses on a time series does not change in the case where there is variation in the angular velocity relating to the rotation angle, and sets this estimated rotational period as the rotational period.

In the motor control apparatus according to a ninth aspect of the present invention, the rotational state quantity sensor may be provided with an angle sensor (position sensor 15 in an embodiment, for example) for outputting the pulse in accordance with the rotation angle of the motor, and the motor control apparatus may be provided with an approximating device (synchronous controller 31 in an embodiment, for example) which estimates an estimated rotational period of the motor by assuming that the amount of change in the interval between adjacent pulses on a time series is a specific amount in the case where there is variation in the angular velocity relating to the rotation angle, and sets this estimated rotational period as the rotational period.

In the motor control apparatus according to a tenth aspect of the present invention, the rotational state quantity sensor may be provided with an angle sensor (position sensor 15 in an embodiment, for example) for outputting a pulse in accordance with the rotation angle of the motor, and the motor control apparatus may be provided with an approximating device (synchronous controller 31 in an embodiment, for example) which estimates an estimated rotational period of the motor by assuming that the amount of change in the interval between adjacent pulses in a time series is changing in accordance with a specific ratio in the case where there is variation in the angular velocity relating to the rotation angle, and sets this estimated rotational period as the rotational period.

In the motor control apparatus according to an eleventh aspect of the present invention, the rotational state quantity sensor may be provided with an angle sensor (position sensor 15 in this embodiment, for example) for outputting the pulse in accordance with the rotation angle of the motor, and the motor control apparatus may be provided with an approximating device (synchronous controller 31 in an embodiment, for example) which estimates an estimated rotational period of the motor by assuming that the interval between adjacent pulses in a time series is changing in accordance with a specific ratio in the case where there is variation in the angular velocity relating to the rotation angle, and sets this estimated rotational period as the rotational period.

In the motor control apparatus according to a twelfth aspect of the present invention, the motor may be a claw pole type motor equipped with a rotor (rotor 51 in an embodiment, for example) which has a permanent magnet; and a stator (stator 52 in an embodiment, for example) which has multiphase claw induction poles (U-phase teeth 72, V-phase teeth 74, W-phase teeth 76 in an embodiment, for example) that are opposingly disposed to the stator in the radial direction and which are arrayed in the circumferential direction, and a multiphase annular coils (U-phase annular coil 64 and W-phase annular coil 65 in an embodiment, for example).

In the motor control apparatus according to the first aspect of the present invention, when executing sequential control processing such as current feedback control of the motor, it is possible to synchronize the sampling period for obtaining detected values, such as the current flowing through the motor or the rotational state quantity of the motor, with the rotational period of the motor by using a control period that corresponds to the period of the carrier signal (a control period that is equivalent to the period of the carrier signal, for example). As a result, it is possible to limit deterioration in motor control stability caused arising from detection system errors. Moreover, by setting the frequency of the carrier signal so that it becomes a value corresponding to the multiplier (i.e., so that it is equal to the multiplier) for one period of the rotational period of the motor in terms of electrical angle, it is possible to prevent the frequency of the carrier signal from increasing excessively accompanying an increase in the rotational frequency of the motor, and to prevent a deterioration in the stability of motor control caused by the higher harmonic components that are included in the motor's induction voltage and the current flowing through the motor.

Further, the control period is synchronized to the rotational period of the motor when the rotational frequency of the motor is equal to or greater than a specified frequency and the phase difference (the initial value of the phase difference, for example) is equal to or less than a specified value. As a result, it is possible to prevent the process of synchronizing the control period to the rotational period of the motor from being carried out excessively when the rotational frequency of the motor is less than a specified frequency, and to prevent the process of synchronizing the control period to the rotational period of the motor from becoming difficult in the case where the initial value of the phase difference is greater than the specified value.

In the motor control apparatus according to the second aspect of the present invention, the control period for the carrier signal can be synchronized with the rotational period of the motor under conditions in which the specified phase difference, which includes zero for example, is set between the control period and the rotational period of the motor. As a result, the general usability of processing employing a frequency setting device and a synchronizing device can be improved.

In the motor control apparatus according to the third aspect of the present invention, current control of the motor is carried out based on the average value of the current values that are detected over a specified period relating to the rotational period of the motor (a period equivalent to the rotational period of the motor, for example). As a result, it is possible to prevent a deterioration in the stability of the control system arising from detection errors by the current sensor.

In the motor control apparatus according to the fourth aspect of the present invention, the rotational state quantity sensor is acceptable as long as it is one that outputs a signal synchronized with the rotational period of the motor. Thus, in addition to a resolver or other such sensors that are equipped to the motor, in a hybrid vehicle or the like, in which a motor as a drive source is connected in series to an internal combustion engine, it is also possible to employ a variety of other types of sensors as the rotational state quantity sensor, such as the pulse sensors which are equipped to an internal combustion engine and capable of outputting a relatively high accuracy signal that are used.

In the motor control apparatus according to the fifth aspect of the present invention, excessive execution of processing to synchronize the control period with the rotational period of the motor can be prevented.

In the motor control apparatus according to the sixth aspect of the present invention, it is possible to prevent the control period from reaching the response threshold of the various components and control apparatus, etc., when the rotational period of the motor has changed.

In the motor control apparatus according to the seventh aspect of the present invention, the period Tc of the carrier signal is set in the specified equation $(Tc=(T-k \times \Delta t)/N)$, based on a specified coefficient k which is equal to or less than one and greater than zero. Thus, for example, by setting the specified coefficient k to be less than 1 when the rotational period of the motor varies, it is possible to suitably set the control gain when converging the phase difference $\Delta t$ to zero, and to prevent oscillation, etc. in the phase difference $\Delta t$.

In the motor control apparatus according to any one of the eighth through eleventh aspects of the present invention, it is possible to easily estimate the rotational period with good accuracy when the angular velocity of the motor rotation angle is changing, without requiring complicated analysis processing.

Further, in the motor control apparatus according to the twelfth aspect of the present invention, it is possible to suitably increase the output of a claw pole type motor, while decreasing the size thereof.

BRIEF DESCRIPTION OF THE DRAWINGS

FIGS. 10A through 10C are diagrams showing the phase of the carrier signal and the change in the induction voltage of the motor according to a first embodiment of the present invention.

DETAILED DESCRIPTION OF THE INVENTION

Preferred embodiments of the motor control apparatus according to the present invention will now be explained with reference to the accompanying figures.

Figure 1:
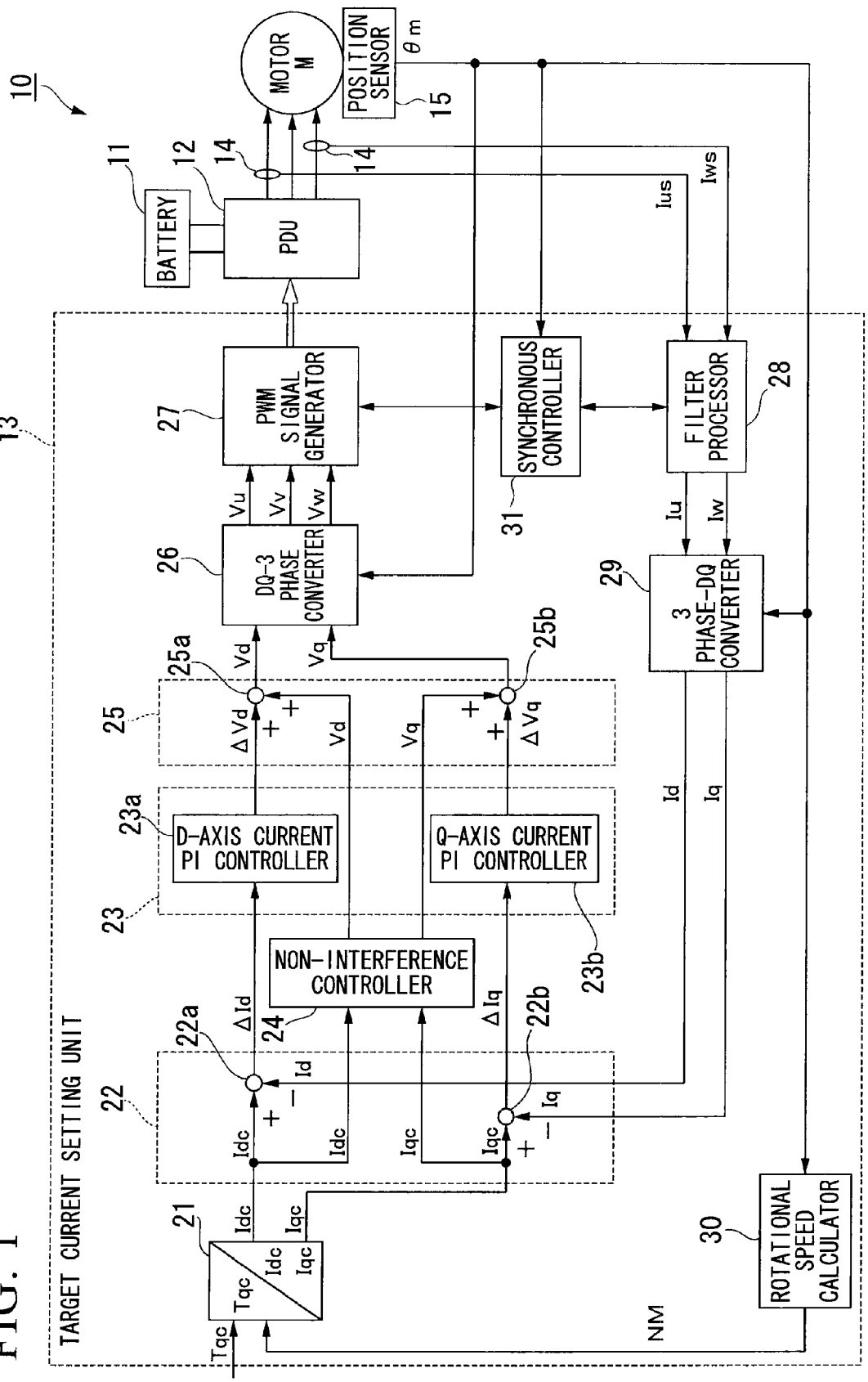
FIG. 1 is a block diagram of the motor control apparatus according to a first embodiment of the present invention.

A motor control apparatus 10 according to this embodiment is provided with a power drive unit (PDU) 12, which employs a battery 11 as a direct current source, and a controller 13, as shown in FIG. 1. This motor control apparatus 10 is installed in a hybrid vehicle or electric vehicle that is equipped with a motor M as the drive source, for example.

In this motor control apparatus 10, the power drive unit (PDU) 12 receives control commands output from the controller 13 and carries out the driving and regenerating operations of the motor M.

The PDU 12 includes, for example, a PWM inverter by pulse width modulation (PWM) having a bridge circuit with a plurality of switching elements of transistors connected by bridges, and the high voltage battery 11 for supplying and receiving electric energy to and from the motor M is connected to the PDU 12.

When driving the motor control apparatus 10, for example, the PDU 12 switches the ON (conducting)/OFF (cutoff) state of the respective paired transistors at each phase at the PWM inverter, based on a gate signal (i.e., PWM signal), which is a switching command that is input from the controller 13. As a result, The PDU 12 converts DC power supplied from the battery 11 to three-phase AC power, performs successive communication of current to three-phase stator windings, and thus passes alternating currents of U-phase current Iu, V-phase current Iv and W-phase current Iw through the each phase of the stator windings.

The controller 13 carries out feedback control of current on d-q coordinates that form rotating orthogonal coordinates. For example, the controller 13 calculates the d-axis target current Idc and the q-axis target current Iqc from a torque command Tqc which is set in response to the initiation of acceleration relating to an acceleration operation by the driver; calculates the three-phase output voltages Vu, Vv and Vw based on the d-axis target current Idc and the q-axis target current Iqc; inputs a PWM signal, which is a gate signal, to the PDU 12 in accordance with the respective phase output voltages Vu, Vv and Vw; and controls so that the respective deviations between the d-axis current Id and the q-axis current Iq, which are obtained by converting the detection values of the respective phase currents Iu, Iv and Iw that are actually supplied from the PDU 12 to the motor control apparatus 10 on the d-q coordinates, and the d-axis target current Idc and the q-axis target current Iqc, becomes zero.

For example, when driving of the motor M, the controller 13 generates gate signals (i.e., pulse width modulating signals) which are switching commands consisting of pulses for ON/OFF driving of the switching elements of the PWM inverter. These gate signals are generated by using pulse width modulation based on the respective phase output voltages Vu, Vv and Vw, which have a sinusoidal waveform, and a carrier signal, which is a triangular wave or the like, and has a phase and frequency in accordance with the control of a synchronous controller 31 explained below. Next, by switching the ON (conducting)/OFF (cutoff) state of the respective paired transistors for each of the three phases in the PWM inverter, the DC power supplied from the battery 11 is converted to three-phase AC power, current to three-phase stator windings of the motor is successively commutated, and thus alternating currents of U-phase current Iu, V-phase current Iv and W-phase current Iw pass through the each phase of the stator windings.

Note that duty cycle of the pulse for ON/OFF driving of each transistor UH/UL, VH/VL, and WH/WL using pulse width modulation (PWM), i.e., the map (data) of the ON/OFF ratio, is stored in advance in the controller 13.

For this reason, the controller 13 receives the input of the detection signals (U-phase detection current Ius, W-phase detection current Iws, etc., for example) output from a current sensor 14 which detects at least any two of the respective phase currents Iu, Iv and Iw supplied from the PDU 12 to the each phase of the stator windings of the motor M (U-phase current Iu, W-phase current Iw, etc., for example); the detection signals output from a position sensor 15 that detects the rotation angle θm of the rotor of the motor M (i.e., the rotational position of the rotation axis of motor M, which is the rotation angle of the magnetic pole of the rotor from a specific standard rotational position) which is used in coordinate conversion processing, etc.; and the detection signals output from a voltage sensor (not shown in the figures) that detects the terminal voltage (power source voltage) of the battery 11.

Figure 2:
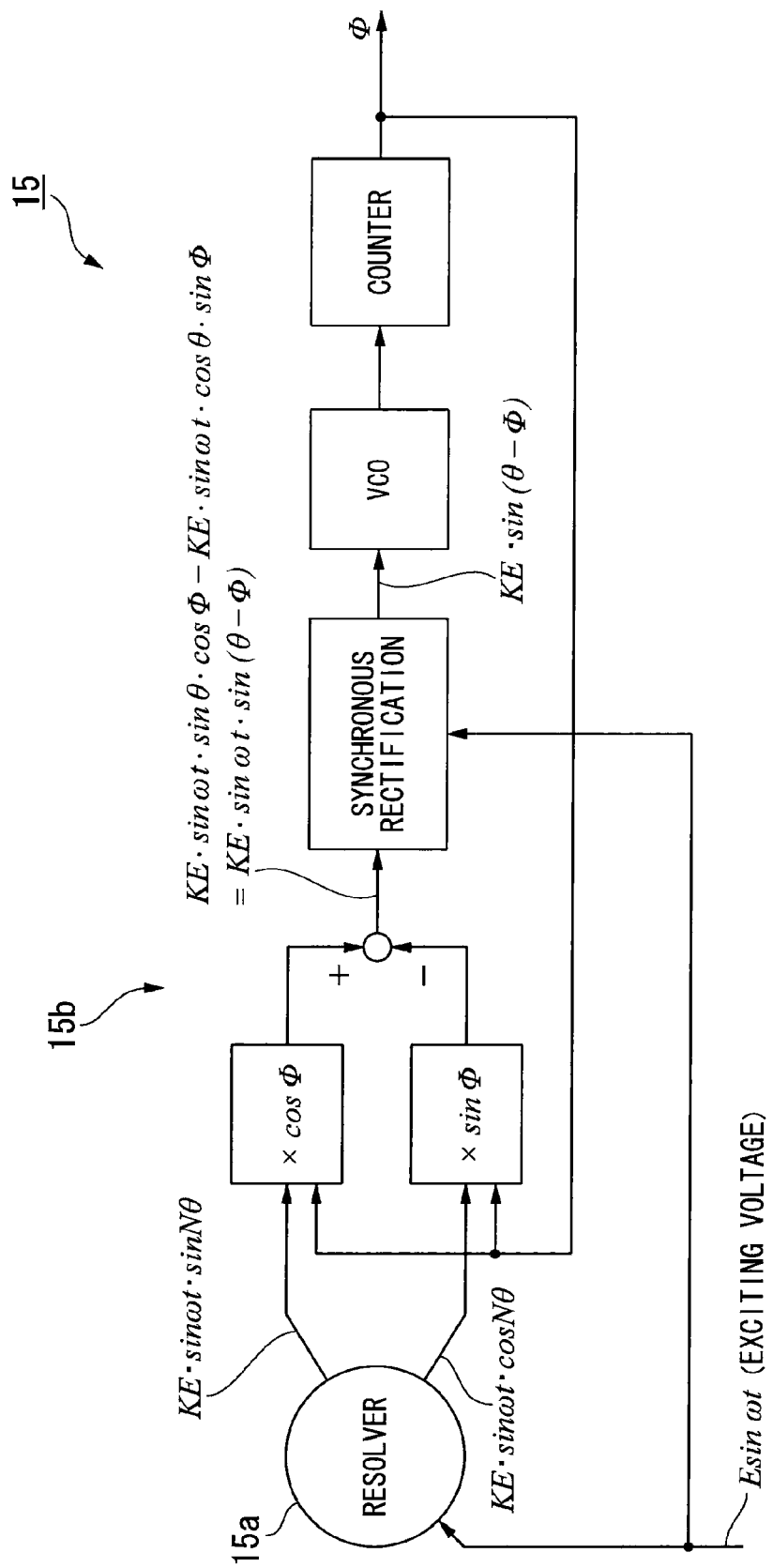
FIG. 2 is a block diagram of the position sensor according to a first embodiment of the present invention.

Note that, as shown in FIG. 2 for example, the position sensor 15 is provided with a resolver 15a and a R/D (resolver/digital) converter 15b. An exciting voltage E sinc ωt is supplied from an exciting circuit (not shown in the figures) to the resolver 15a, and two output signals (K·E sin ωt·sin θ and K·E sin ωt·cos θ) in accordance with the rotation angle θ output from the resolver 15a are input to the R/D converter 15b. In the R/D converter 15b, the difference (K·E sin ωt·sin(θ−Φ)) between the value obtained by multiplying (cos Φ) to one of the output signals (K·E sin ωt·sin θ), and the value obtained by multiplying (sin Φ) to the other output signal (K·E sin ωt·cos θ), is input to a synchronous rectification circuit. The signal (K·E·sin(θ−Φ)) which is output after synchronous rectification in accordance with the exciting voltage E sin ωt in the synchronous rectification circuit is input to a voltage controlled oscillator (VCO), and the signal output from this voltage controlled oscillator is input to a counter. The output counter value Φ is then output from this counter as the absolute electrical angle, and feedback control is then performed so that θ=Φ.

The R/D (resolver/digital) converter 15b outputs a pulse train for the Z-phase, which is the origin phase.

The controller 13 executes current feedback control on a control period which is the same as the period of the carrier signal that is employed in pulse width modulation processing at a PWM signal generator 27, explained below, and obtains detection values for the respective phase currents Iu, Iv and Iw at a sampling period that is the same as the period of the carrier signal.

When repeatedly executing sequential control processing in current feedback control, the controller 13 carries out synchronization control to synchronize this control period to the rotational period of the motor M.

This controller 13 is provided with, for example, a target current setting unit 21; a current deviation calculator 22; a current controller 23, a non-interference controller 24; a voltage corrector 25, a dq-3 phase converter 26; a PWM signal generator 27; a filter processor 28; a 3 phase-dq converter 29; a rotational speed calculator 30; and a synchronization controller 31.

Based on the torque command Tqc (i.e., the command value for generating the required torque to the motor M in response to the amount of depression of the acceleration pedal by the driver) and the revolutions NM of the motor M input from the rotational speed calculator 30, the target current setting member 21 calculates a current command for specifying the respective phase currents Iu, Iv and Iw that are supplied from the PDU 12 to the motor M. This current command is output to the current deviation calculator 22 as the d-axis target current Idc and the q-axis target current Iqc on the rotating orthogonal coordinates.

The d-q coordinates that form these rotating orthogonal coordinates sets, for example, a direction of a magnetic flux of a field pole by the permanent magnet of the rotor in a d-axis (a field axis) and sets a direction orthogonal to this d-axis in a q-axis (a torque axis), and rotates in synchrony with the rotation phase of the rotor. As a result, the d-axis target current Idc and the q-axis target current Iqc, which are DC signals, are provided as current commands to the AC signals supplied from the PDU 12 to the respective phases of motor M.

The current deviation calculator 22 is provided with a d-axis current deviation calculator 22a for calculating the deviation ΔId between the d-axis target current Idc and the d-axis current Id; and a q-axis current deviation calculator 22b for calculating the deviation ΔIq between the q-axis target current Iqc and the q-axis current Iq.

The current controller 23 is provided with a d-axis current PI controller 23a which uses PI (proportional-plus-integral) operations to control and amplify the deviation ΔId and calculate the d-axis voltage command ΔVd; and a q-axis current PI controller 23b which uses PI (proportional-plus-integral) operations to control and amplify the deviation ΔIq and calculate the q-axis voltage command ΔVq.

Based on the d-axis target current Idc and the q-axis target current Iqc, and the d-axis inductance Ld and q-axis inductance Lq which are recorded in advance, the non-interference controller 24 calculates the d-axis compensatory term Vdc and the q-axis compensatory term Vqc for canceling out the various interference components imparted on the d-axis and the q-axis, in order to independently control the d-axis and the q-axis by canceling out the motional electromotive forces that interfere between the d-axis and the q-axis.

The voltage corrector 25 is provided with a d-axis voltage adder 25a which adds the d-axis voltage command ΔVd and the d-axis compensatory term Vdc, and employs the obtained value as the d-axis voltage command Vd; and a q-axis voltage adder 25b which adds the q-axis voltage command ΔVq and the q-axis compensatory term Vqc, and employs the obtained value as the q-axis voltage command Vq.

The dq-3 phase converter 26 uses an rotation angle θm which corresponds to the rotational position of the motor M that is input from the position sensor 15 to convert the d-axis voltage command Vd and the q-axis voltage command Vq on the d-q coordinates, to a U-phase output voltage Vu, a V-phase output voltage Vv and a W-phase output voltage Vw, which are the voltage command values, on a three-phase AC coordinates which are static coordinates.

The PWM signal generator 27 generates a gate signal (i.e., a PWM signal) which is a switching command consisting of pulses for ON/OFF driving of the switching elements of the PWM inverter of the PDU 12, using pulse width modulation based on the sinusoidal respective phase output voltages Vu, Vv and Vw, and the carrier signal which consists of a triangular wave.

The filter processor 28 carries out filter processing, such as the removal of high frequency components and the like, of the detection signals Ius and Iws for the respective phase currents that are detected by the respective current sensors 14, 14, and extracts the respective phase currents Iu and Iw as physical quantities in response to the control of the synchronous controller 31, explained below.

Based on the respective phase currents Iu and Iw extracted by the filter processor 28 and the rotation angle θm corresponding to the rotational position of the motor M that is input from the position sensor 15, the 3 phase-dq converter 29 calculates the d-axis current Id and the q-axis current Iq on the rotating coordinates by rotation phase of the motor M, i.e., on the d-q coordinates.

The rotational speed calculator 30 calculates the revolutions NM of the motor M from the detection signal output by the position sensor 15.

When repeatedly executing the sequential control processing in current feedback control, the synchronous controller 31 detects the phase difference between the Z-phase pulse output from the position sensor 15, which is the origin phase, i.e., the pulse output at a 360° (edeg) period in terms of electrical angle synchronized with the rotation of the motor M, and the interrupt counter which is based on a specified multiplier set in advance in response to the revolutions of the motor M and the control period for current feedback control. The synchronous controller 31 then executes synchronous control when the rotational frequency of the motor M (i.e., the product of revolutions and polar pairs) is equal to or greater than a specific frequency and the phase difference is equal to or less than a specific value.

Figure 3:
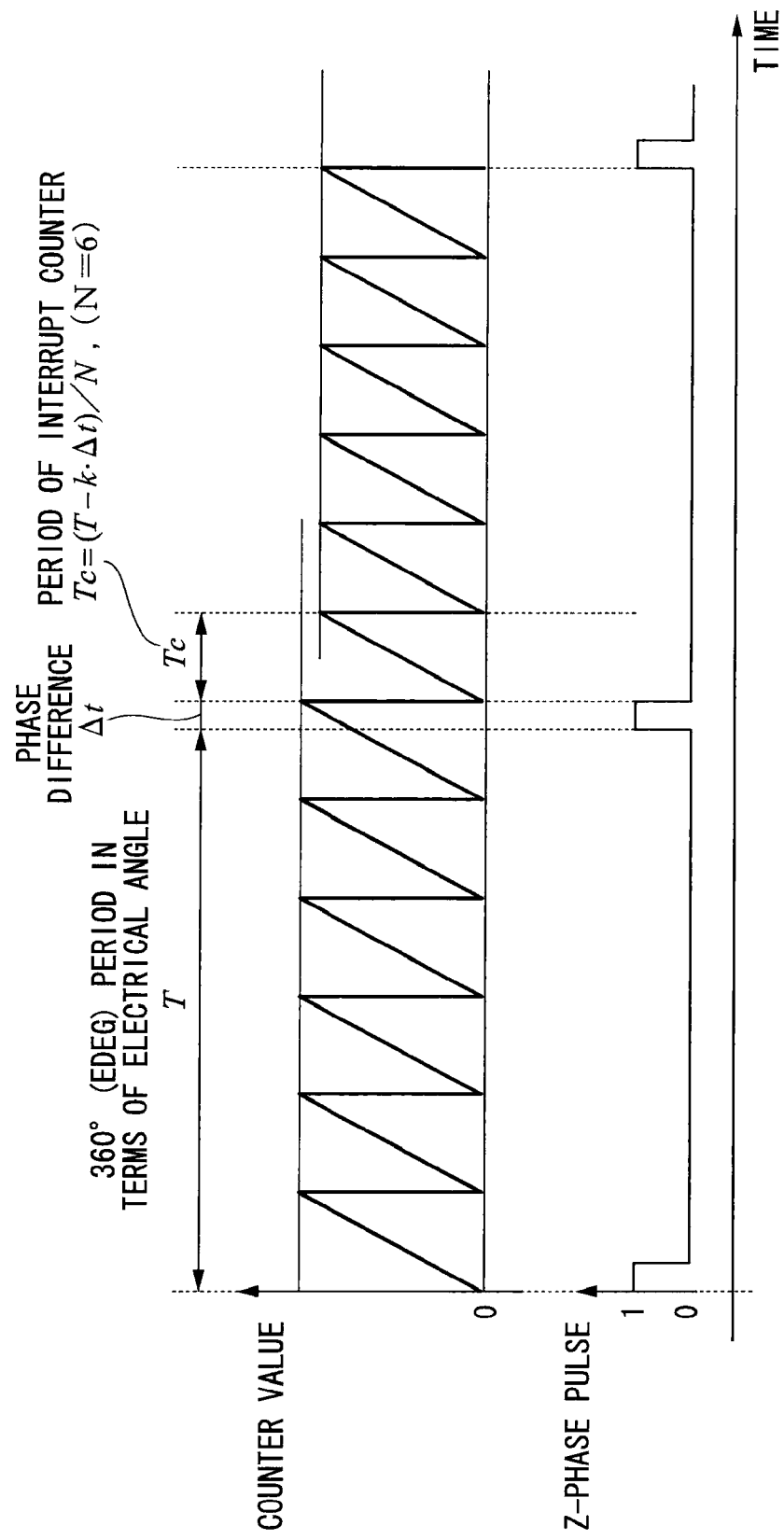
FIG. 3 is a diagram showing an example of the time variation in the period of the interrupt counter and the rotational period of the motor according to a first embodiment of the present invention.

The synchronous controller 31 is provided with an addition-type interrupt counter in which data of specific multipliers N in response to the revolutions of the motor M are recorded in advance, and the counter value of which is initialized at each period of the carrier signal. For example, as shown in FIG. 3, a period of the carrier signal (i.e., a period of the interrupt counter) Tc is set according to the following equation (7), where Δt is the phase difference between the Z-phase pulse output from the position sensor 15 and the timing at which the counter value of the interrupt counter becomes zero, N is the multiplier, k is a specified coefficient that is equal to or less than 1 but greater than 0, and T is one period in terms of electrical angle of the rotational period of the motor M in accordance with the Z-phase pulse output from position sensor 15.

$$Tc = (T - k \cdot \Delta t)/N \quad \text{[Equation 7]}$$

For example, when change in the acceleration of motor M can be ignored, then the phase differences Δt (n) and Δt (n+1), which are adjacent on a time series and where n is an optional natural number, can be described as shown in equation (8) below. Thus, when the specified coefficient k is set to 1, then the phase difference Δt becomes zero in the subsequent processing in which the period Tc of the carrier signal is set in accordance with equation (7) above.

Further, when the specified coefficient k is set to a value which is less than 1 but greater than 0, the period Tc of the carrier signal is repeatedly setting in accordance with equation (7), and the phase difference Δt converges to zero as a result.

$$\Delta t(n+1) = (1-k) \cdot \Delta t(n) \quad \text{[Equation 8]}$$

Figure 4:
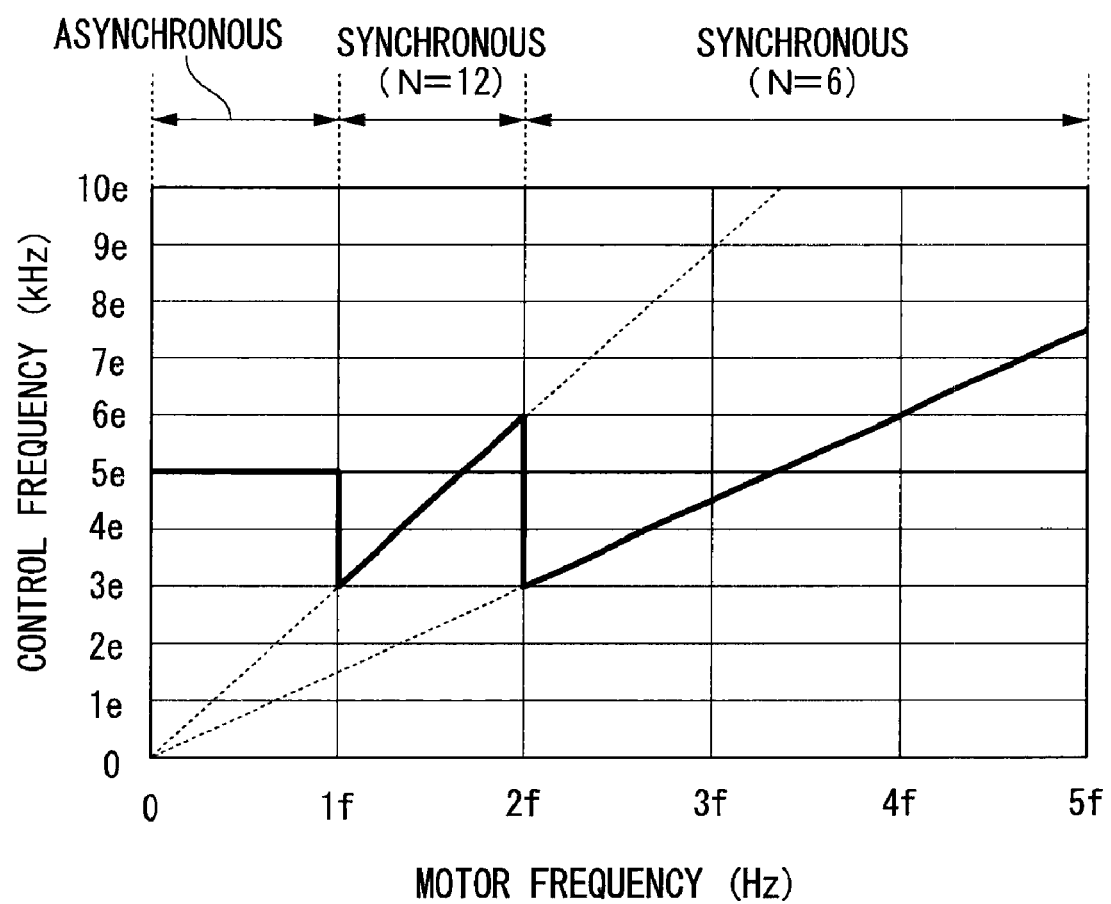
FIG. 4 is a diagram showing an example of the relationship between the control frequency and the motor frequency according to a first embodiment of the present invention.

The specified multiplier N which is preset in response to the revolutions of the motor M, is set so as to change in a decreasing trend toward a specified lower limit value, as the rotational frequency of the motor M (i.e., motor frequency) increases a specified upper limit period and above. For example, in the example shown in FIG. 4, when the motor frequency is less than a specified value 1f, the control frequency of the current feedback control, i.e., the carrier signal frequency, is held at the specified value 5e without synchronous control being carried out.

When the motor frequency is equal to or greater than the specified value 1f and less than the specified value 2f(>1f), synchronous control is carried out, the multiplier N is set to 12, and the control frequency of the current feedback control, i.e., the carrier signal frequency, is changed in accordance with equation (7).

When the motor frequency increases to equal to or greater than the specified value 2f(>1f), the multiplier N is decreased to 6 while maintaining execution of synchronous control, and the control frequency of the current feedback control, i.e., the carrier signal frequency, changes in accordance with equation (7).

Namely, the synchronous controller 31 sets specific upper limit and lower limit frequencies for the control frequency (or specific lower limit and upper limit periods for the control period) for each specified multiplier N in response to the revolutions of the motor M. In synchronous control execution, the multiplier N is decreased when the control frequency exceeds a specified upper limit frequency (or when the control period is less than a specified lower limit period) and the multiplier N is equal to or greater than a specified lower limit. Conversely, the multiplier N is increased when the control frequency is equal to or less than a lower limit frequency (or when the control period is equal to or greater than the specific upper limit period).

When executing synchronous control, the synchronous controller 31 sets the multiplier N so that the control frequency of the current feedback control, i.e., the frequency of the carrier signal, does not exceed the specified response thresholds of the control apparatus or the various switching elements of the PDU 12 for example, even in the case where the control frequency is increasing accompanying an increase in the motor frequency in accordance with equation (7).

The synchronous controller 31 prohibits execution of synchronous control when the control period of the current feedback control is less than a specified lower limit period and the multiplier N in response to the revolutions of motor M is less than a specified lower limit value.

When executing synchronous control, the synchronous controller 31 extracts average values for the respective phase currents Iu and Iw over a specified period (a 360° (edeg) period in terms of electrical angle, for example) as physical quantities at the filter processor 28, based on the detection signals Ius and Iws for respective phase currents that are detected by the respective current sensors 14, 14 over a specified period (a 360° (edeg) period in terms of electrical angle, for example) that relates to the rotational period of the motor M. Next, based on these average values, the synchronous controller 31 provides settings so that current feedback control is performed.

The motor control apparatus 10 according to this embodiment is provided with the above-described design. The operations thereof will now be explained with reference to the accompanying figures.

Control decision processing to decide whether or not it is necessary to execute synchronous control will now be explained.

Figure 5:
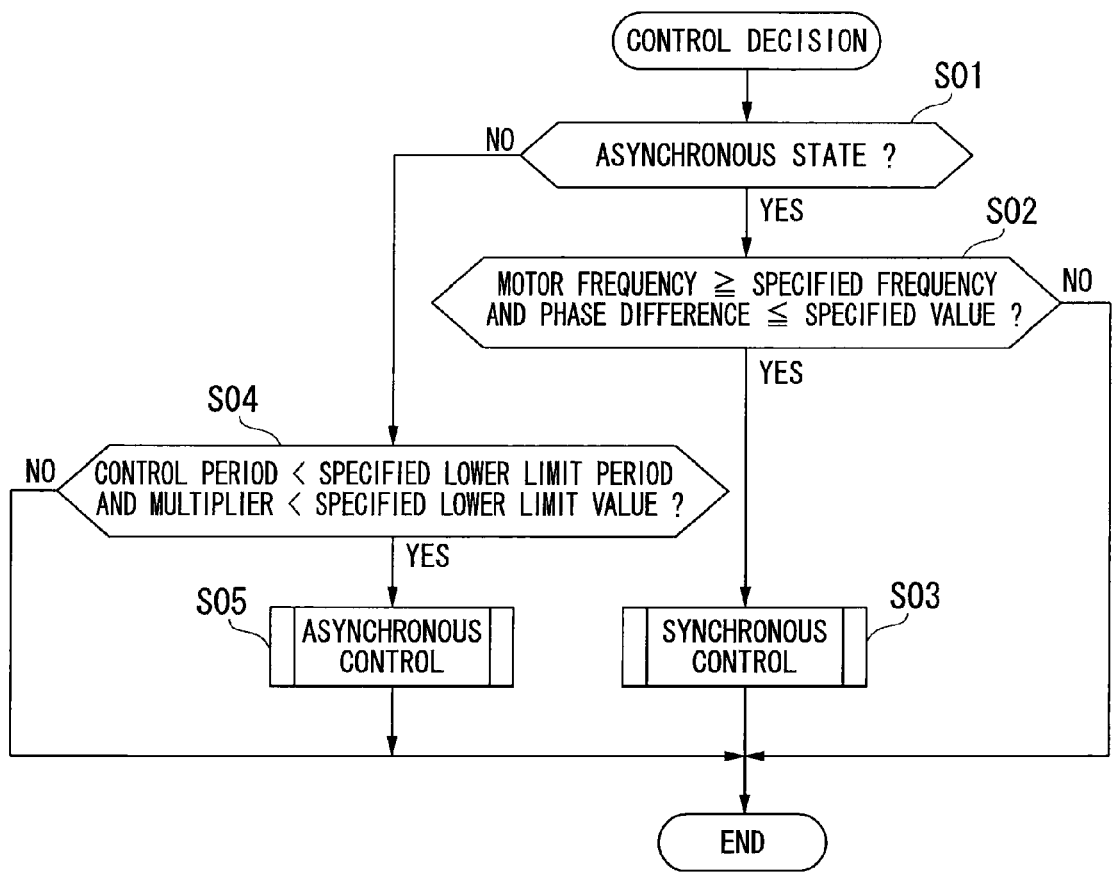
FIG. 5 is a flowchart showing the control decision processing according to a first embodiment of the present invention.

First, in step S01 shown in FIG. 5, a decision is made as to whether or not a synchronous control non-execution state, wherein the control frequency of current feedback control is being maintained at a suitable value, is present.

When the decision result is [NO], the process proceeds to step S04.

When the decision result is [YES], the process proceeds to step S02.

In step S02, a decision is made as to whether or not the motor frequency, which is detected in accordance with the detection signals output from the position sensor 15, is equal to or greater than the specified frequency and the phase difference is equal to or less than a specified value.

When the decision result is [NO], sequential processing concludes.

When the decision result is [YES], the process proceeds to step S03, where synchronous control is initiated and sequential processing is then concluded.

In step S04, a decision is made as to whether or not the control period of the current feedback control is less than a specified lower limit period and the multiplier in response to the revolutions of the motor M are less than a specified lower limit value.

When the decision result is [NO], sequential processing concludes.

When the decision result is [YES], the process proceeds to step S05, where a synchronous control non-execution state is set, and sequential processing is concluded.

The processing for setting the multiplier in the synchronous control in step S03 will now be explained.

Figure 6:
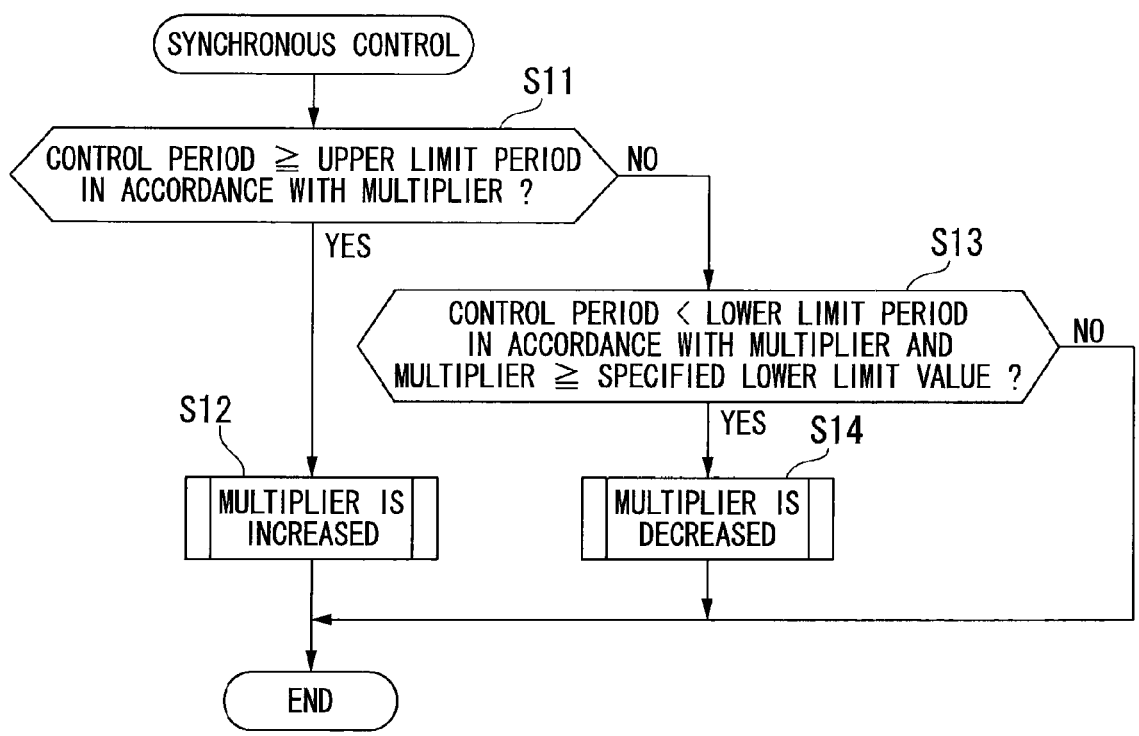
FIG. 6 is a flowchart showing the synchronization control processing according to a first embodiment of the present invention.

First, in step S11 shown in FIG. 6 for example, a decision is made as to whether or not the control period of current feedback control is equal to or greater than a specified upper limit period that is preset in accordance with the multiplier at that time point.

When the decision result is [NO], the process proceeds to step S13.

When the decision result is [YES], the process proceeds to step S12.

In step S12, a multiplier map or the like which was preset in accordance with the motor frequency and the control frequency is referenced, the multiplier is increased and sequential processing is concluded.

In step S13, a decision is made as to whether or not the control period of current feedback control is less than a specified lower limit period that is preset in accordance with the multiplier at that time point, and whether or not the multiplier corresponding to the motor frequency and the control period at that time point is equal to or greater than a specified lower limit value.

When the decision result is [NO], sequential processing is concluded.

When the decision result is [YES], a multiplier map or the like which was preset in accordance with the motor frequency and the control frequency is referenced, the multiplier is decreased and sequential processing is concluded.

Figure 7:
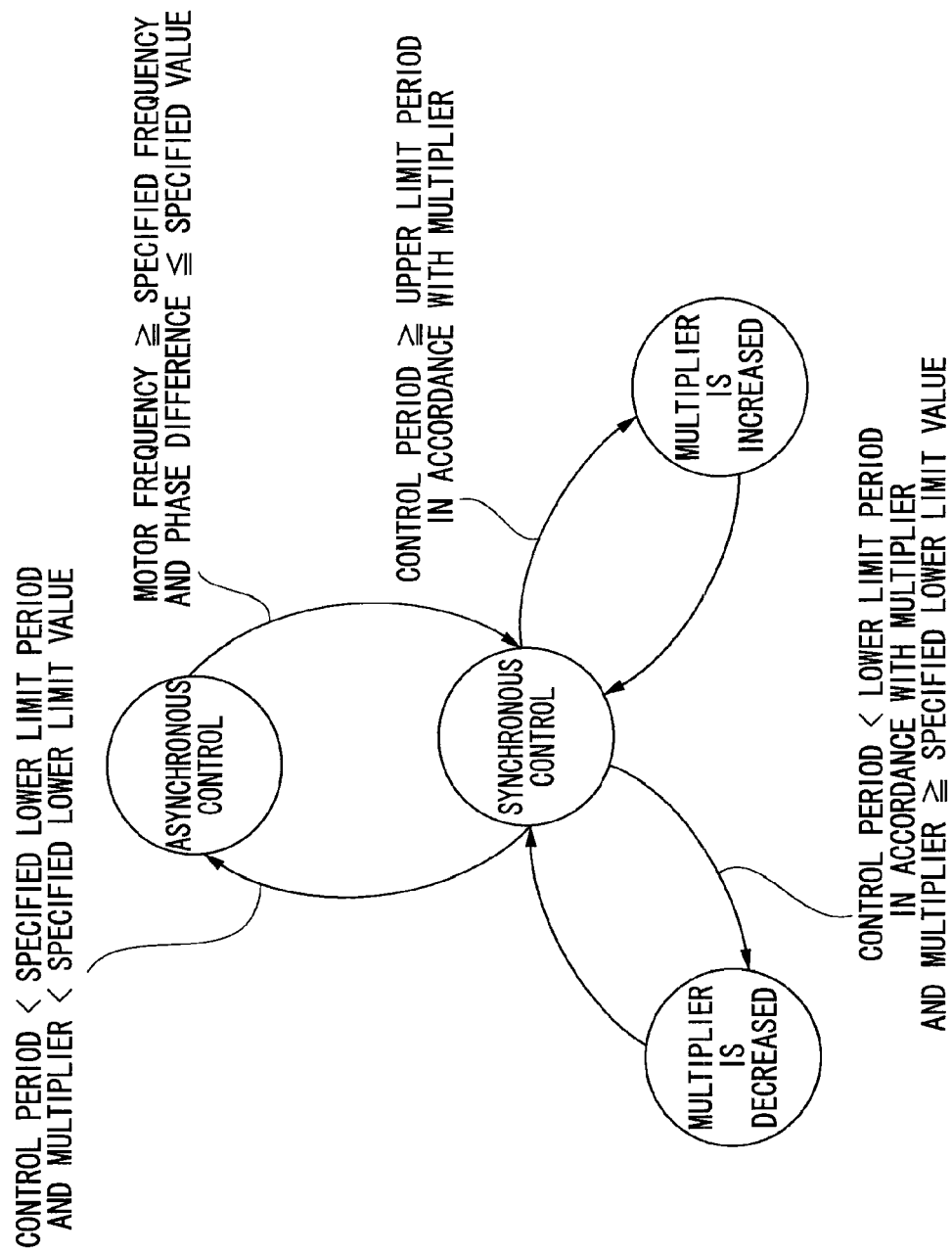
FIG. 7 is a diagram showing an example of the conditions for transitioning between synchronous control and asynchronous control, and the respective transitioning conditions for processing to increase or decrease the multiplier in synchronization processing.

Note that FIG. 7 shows an example of the conditions when transitioning between synchronous and asynchronous control, and an example of the conditions for the various transitions with respect to increasing and decreasing the multiplier in synchronous control.

The process of detecting the phase difference during execution of synchronous control will now be explained.

Figure 8:
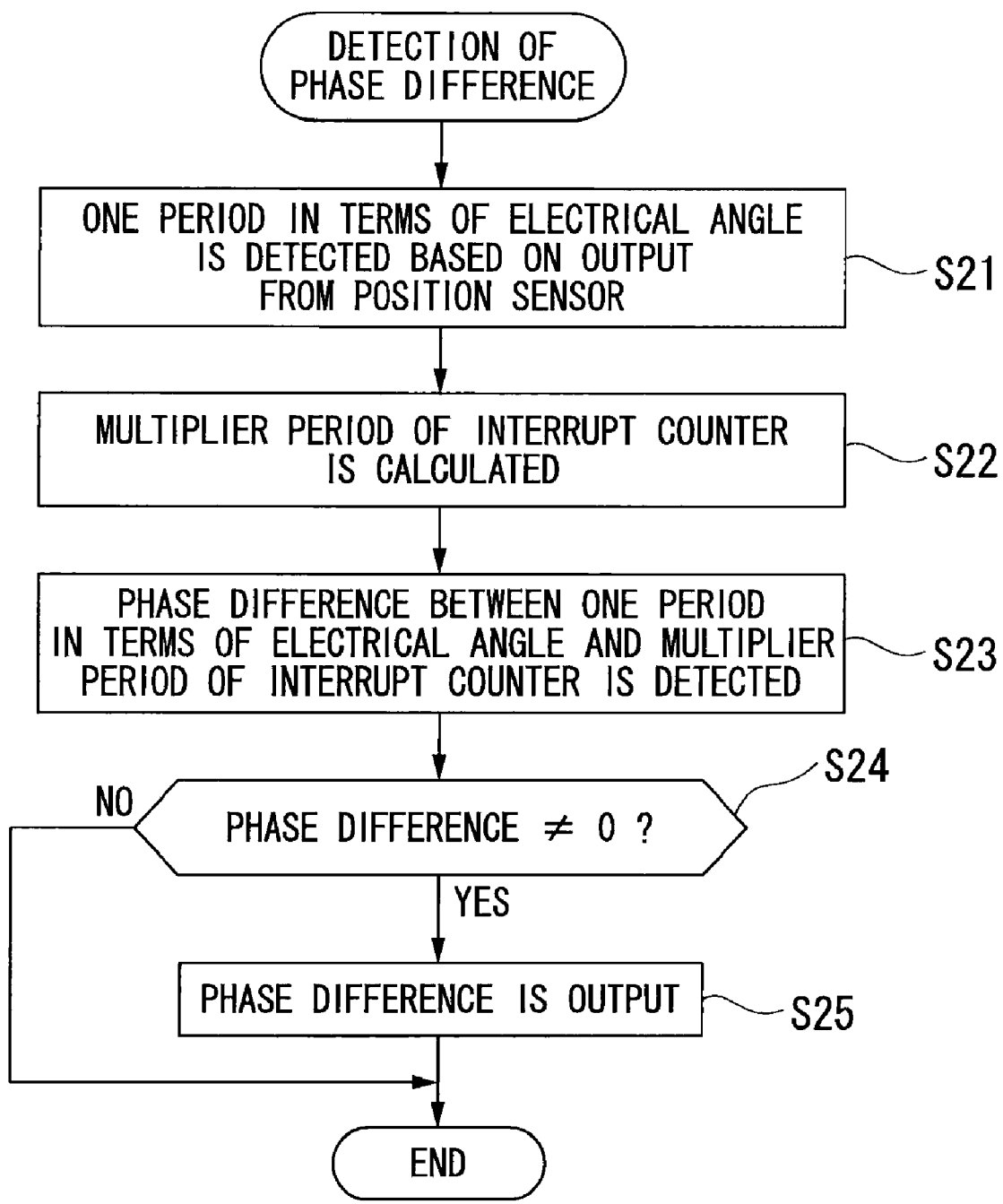
FIG. 8 is a flowchart showing the processing for phase difference detection according to a first embodiment of the present invention.

First, in step S21 shown in FIG. 8 for example, one period in terms of electrical angle of the rotational period of the motor M is detected based on the Z-phase pulse output from the position sensor 15.

Next, in step S22, the specified multiplier set in response to the revolutions of the motor M is obtained, and the period of the interrupt counter (i.e., the period of the carrier signal) is multiplied by the multiplier, to calculate the multiplier period.

Next, in step S23, the phase difference between one period in terms of electrical angle of the rotational period of the motor M and the multiplier period of the interrupt counter is detected.

A decision is then made in step S24 as to whether or not the phase difference is a value other than zero.

When the decision result is [NO], sequential processing is concluded.

When the decision result is [YES], the process proceeds to step S25, and data on the phase difference is output in step S25.

An explanation will now be made of control interrupt processing. Control interrupt processing is processing performed during synchronous control execution, in which sequential control processing in current feedback control is repeatedly executed for each control period that is the same as the period of the carrier signal.

Figure 9:
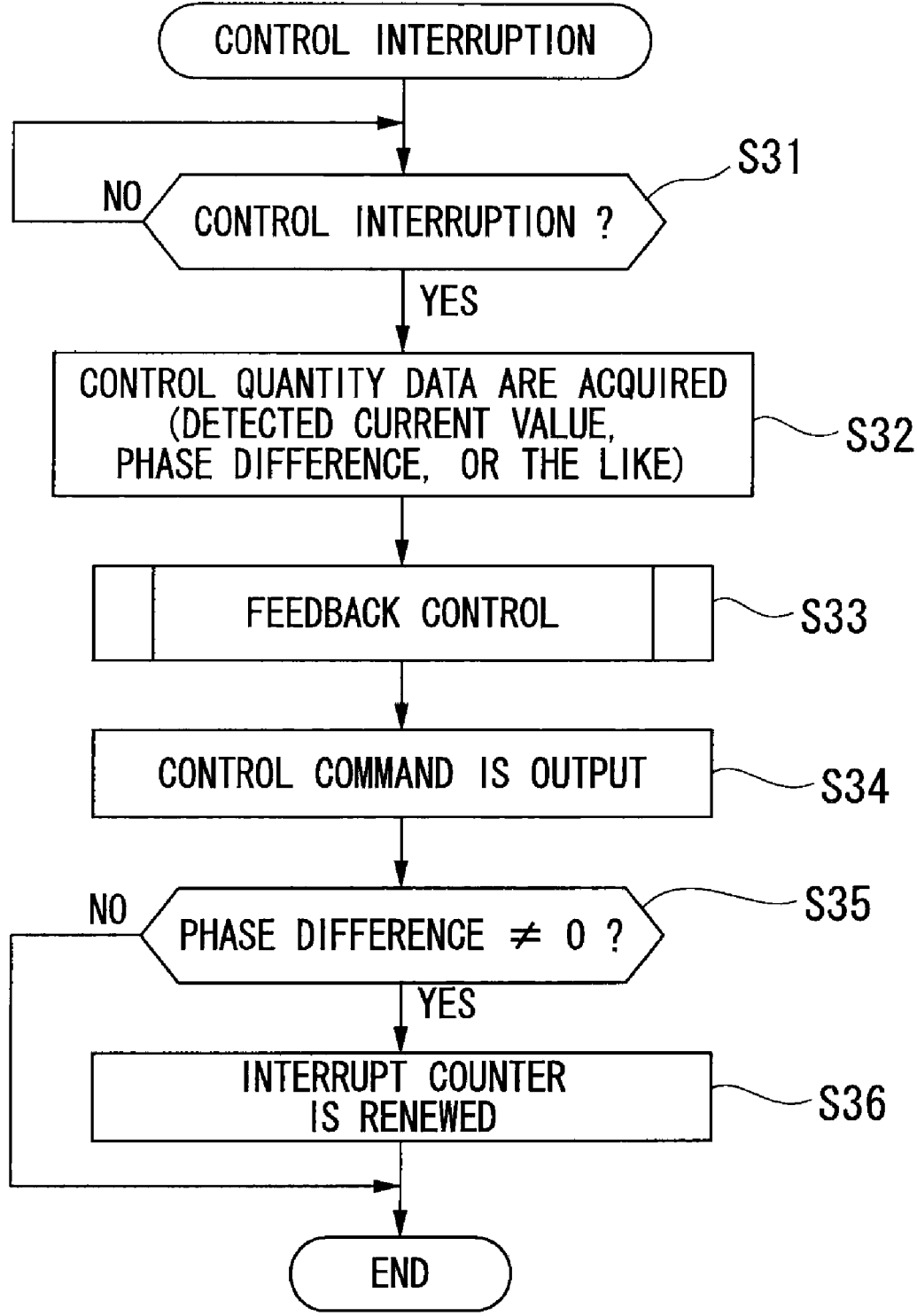
FIG. 9 is a flowchart showing the control interrupt processing according to a first embodiment of the present invention.

First, in the step S31 shown in FIG. 9 for example, a decision is made as to whether or not it is the timing for initializing the counter value based on the counter value of the interrupt counter reaching a specified upper limit value, i.e., a decision is made as to whether or not a control interrupt timing is present.

When the decision result is [NO], the decision processing in step S31 is repeated.

When the decision result is [YES], the process proceeds to step S32.

In step S32, the detection signals Ius and Iws for the respective phase currents that were detected by respective phase current sensors 14, 14, and various control quantity data such as phase difference etc., detected in the above steps S21 to S25 are acquired.

In step S33, current feedback control is executed using the average values of the respective phase currents Iu and Iw over a specified period (a 360° (edeg) period in terms of electrical angle, for example), based on the detection signals Ius and Iws acquired over a specified period (a 360° (edeg) period in terms of electrical angle, for example) relating to the rotational period of the motor M.

Next, in step S34, the control commands under current feedback control are output, i.e., the U-phase output voltage Vu, V-phase output voltage Vv and W-phase output voltage Vw, which are the voltage command values on three-phase AC coordinates which are static coordinates, are output.

In step S35, a decision is made as to whether or not the acquired phase difference is a value other than zero.

When the decision result is [NO], sequential processing is concluded.

When the decision result is [YES], the process proceeds to step S36, and the counter value of the interrupt counter is initialized and the interrupt counter period (i.e., the period of the carrier signal) is newly set according to the above equation (7) for example, after which sequential processing is concluded.

As explained above, when carrying out feedback control on the current of motor M using a control period that corresponds to the period of the carrier signal (a control period which is the same as the period of the carrier signal, for example) in the motor control apparatus 10 according to the present embodiment, it is possible to synchronize the control period with the rotational period of the motor M and to prevent a deterioration in the stability of the motor control arising from errors in the detection system. Moreover, by setting the carrier signal frequency so that it becomes the specified multiplier for one period in terms of electrical angle of the rotational period of the motor M, it is possible to prevent the frequency of the carrier signal from becoming excessively large accompanying an increase in the rotational frequency of the motor M, and to prevent a deterioration in the stability of motor control caused by the induction voltage of motor M and higher harmonic components that are included in the various phase currents of motor M. As a result, it is possible to suitably increase the output while decreasing the size of the motor M.

When the rotational frequency of the motor M is equal to or greater than a specified frequency and the phase difference is equal to or less than a specified value, then the control period is synchronized with the rotational period of the motor M. As a result, it is possible to prevent excessive execution of processing to synchronize the control period with the rotational period of the motor in the case where the rotational frequency of the motor M is less than the specified frequency, and to prevent from becoming difficult the process of synchronizing the control period with the rotational period of the motor M when the initial value of the phase difference is greater than the specified value.

During execution of synchronous control, current feedback control is carried out using the average values of the respective phase currents Iu and Iw over a specified period (a 360° (edeg) period in terms of electrical angle, for example), based on the detection signals Ius and Iws acquired over a specified period (a 360° (edeg) period in terms of electrical angle, for example) relating to the rotational period of the motor M. As a result, it is possible to prevent a deterioration in the stability of the control system arising from detection errors by the respective current sensors 14, 14.

Further, the period Tc of the carrier signal is set based on a specified coefficient k that is equal to or less than 1 and greater than zero in the above equation (7). Accordingly, by setting the specified coefficient k to be less than one when the rotation speed of the motor M varies, it is possible to suitably set the control gain when converging the phase difference $\Delta t$ to zero, and to prevent oscillations, etc., from arising in the phase difference $\Delta t$.

An explanation will now be made of the results of testing in which current feedback control was executed using the motor control apparatus 10 according to the above-described embodiments.

In this testing, as an example of processing corresponding to increasing the rotational frequency of the motor M, the frequency of the carrier signal was decreased and, in this state, synchronous control was performed so that the phase difference between the control period for current feedback control and the rotational period of the motor M becomes zero.

Figure 11A:
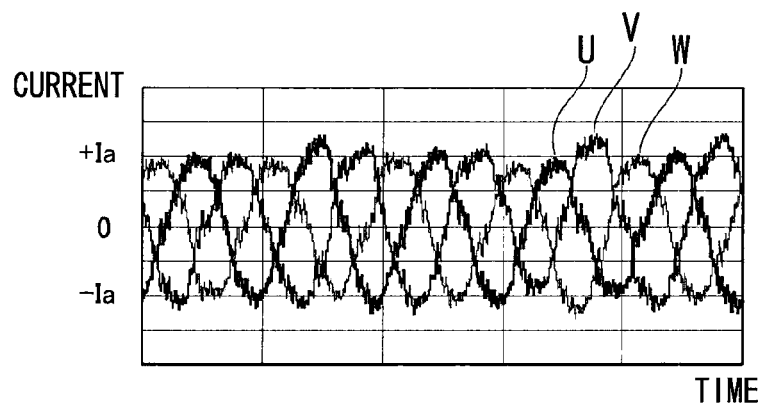
FIGS. 11A through 11C are diagrams showing the time variation in the current amplitude of the various phase currents of the motor according to a first embodiment of the present invention.

First, under an asynchronous control state corresponding to a state in which the rotational frequency of motor M is relatively low, wherein the revolutions of a 10-pole motor M is set to 3000 rpm and the electric current is set to 30 Arms, the carrier signal frequency (i.e., the interrupt counter frequency) is maintained at 10 KHz and the current amplitudes of the respective phase currents (U, V, W phase currents) assume roughly equivalent values, as shown in FIGS. 10A and 11A, for example.

Figure 11B:
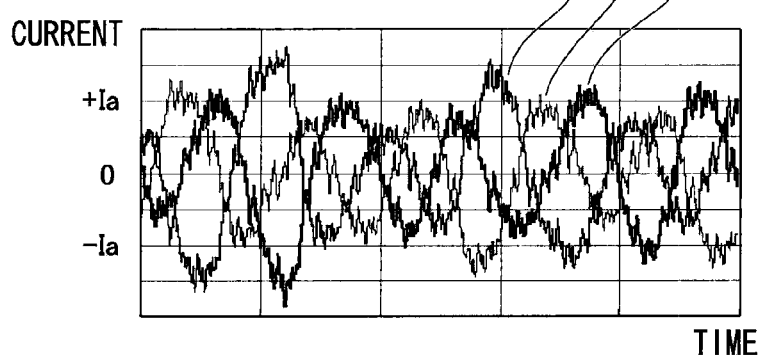

Next, when the frequency of the carrier signal is lowered from 10 kHz to 6 kHz, corresponding to the case where the rotational frequency of the motor M has changed to a relatively high state, the period of the carrier signal changes from a suitable period T1 to a period T2 (>T1) and, as shown in FIGS. 10B and 11B for example, the deviation in the current amplitude of the respective phase currents (U, V, W phase currents) increases due to the phase difference between the rotational period of the motor M and the period of the carrier signal, i.e., the timing at which the counter value of the interrupt counter becomes zero. As a result, current feedback control becomes unstable.

Figure 11C:
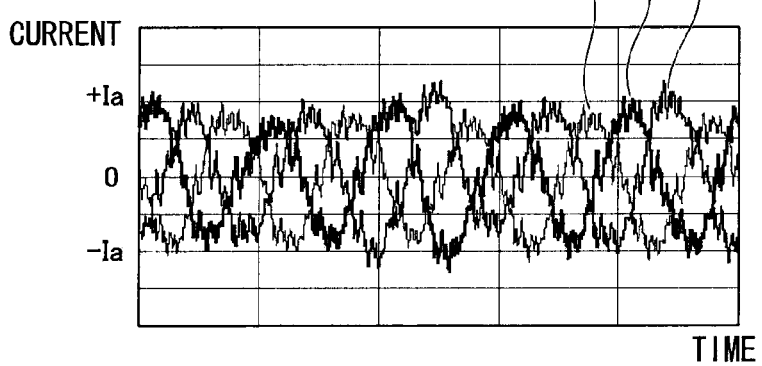

Here, by carrying out synchronous control and setting to zero the phase difference between the rotational period of motor M and the period of the carrier signal, i.e., the timing at which the counter value of the interrupt counter becomes zero, under conditions in which the multiplier in a specified period (a 360° (edeg) period in terms of electrical angle, for example) relating to the rotational period of the motor M is set to 12 (i.e., under conditions where one specified period includes 12 carrier signals), then, as shown in FIGS. 10C and 11C, the current amplitudes of the various phase currents (U, V, W phase currents) assume roughly equivalent values, making it possible to stabilize current feedback control.

Note that in the above-described embodiment, the phase difference detected in steps S21 to S25 was obtained in the control interrupt processing. However, the present invention is not limited thereto; rather, it is also acceptable to detect the phase difference in the control interrupt processing, for example.

Figure 12:
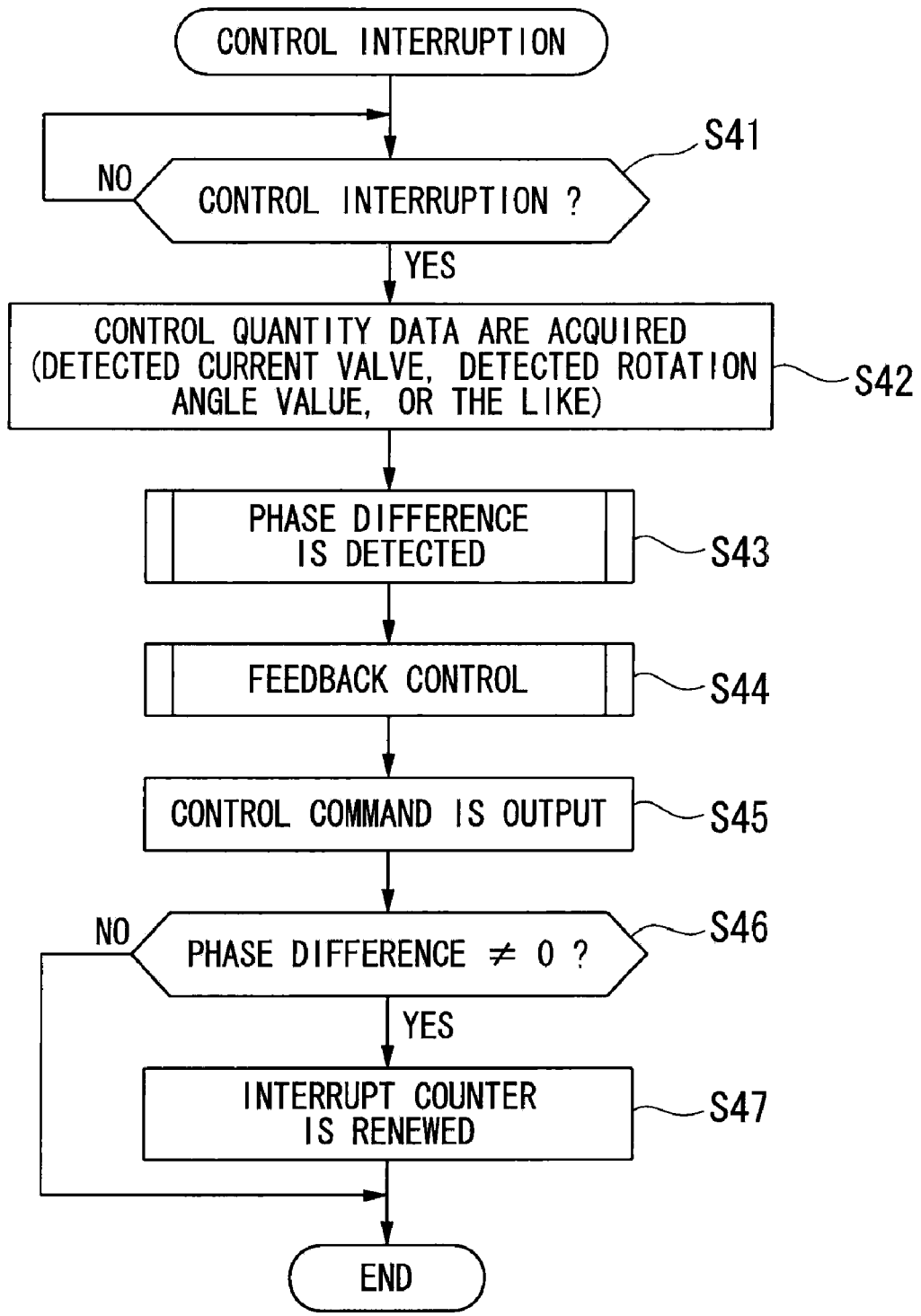
FIG. 12 is a flowchart showing the control interrupt processing according to a modification of the embodiments of the present invention.

In the control interrupt processing according to this modification, as shown in FIG. 12 for example, a decision is first made in step S41 as to whether or not the timing is present for initializing the counter value because the counter value of the interrupt counter has reached a specified upper limit value, i.e., a decision is made as to whether or not a control interrupt timing is present.

When the decision result is [NO], the decision processing of step S41 is repeated.

When the decision result is [YES], the process proceeds to step S42.

In step S42, various control quantity data, such as the detection signals Ius and Iws for the respective phase currents detected by the respective current sensors 14,14 and the detection signals output from position sensor 15, are acquired.

In step S43, the phase difference between the rotation angle θm of the motor M and a specified origin position is detected based on the detection signals output from the position sensor 15.

In step S44, current feedback control is executed using the average values of the respective phase currents Iu and Iw over a specified period (the 360° (edeg) period, for example), based on the detection signals Ius and Iws obtained over a specified period (the 360° (edeg) period, for example) relating to the rotational period of the motor M.

Next, in step S45, the control command in current feedback control is output, i.e., the U-phase output voltage Vu, V-phase output voltage Vv and W-phase output voltage Vw, which are the voltage command values on three-phase AC coordinates which are static coordinates, are output.

In step S46, a decision is made as to whether or not the detected phase difference is a value other than zero.

When the decision result is [NO], sequential processing is concluded.

When the decision result is [YES], the process proceeds to step S47, and the counter value of the interrupt counter is initialized and the interrupt counter period (i.e., the period of the carrier signal) is newly set according to the above equation (7) for example, after which sequential processing is concluded.

In the above-described embodiment, synchronous controller 31 is designed to converge the phase difference Δt to zero. However, the present invention is not limited thereto. Rather, for example, the phase difference Δt can be converged to a specified phase difference.

In the preceding embodiments, synchronous controller 31 detected the rotational period of the motor M based on a pulse output from the position sensor 15. However, the present invention is not limited thereto. Rather, it is acceptable to detect the rotational period of the motor M based on a signal which is synchronized to the rotational period of the motor M. For example, in a hybrid vehicle in which a motor M as a drive source is connected in series to an internal combustion engine, the rotational period of the motor M may be detected based on pulses which are output from various sensors such as pulse sensors that are equipped to the internal combustion engine and are capable of outputting a relatively high precision signal.

Note that in the preceding embodiments, it is acceptable for synchronous controller 31 to estimate the rotational period of the motor M in the case where the angular velocity relating to the rotation angle corresponding to the rotational position of the motor M changes, and to carry out synchronous control based on this estimated rotational period.

Figure 13:
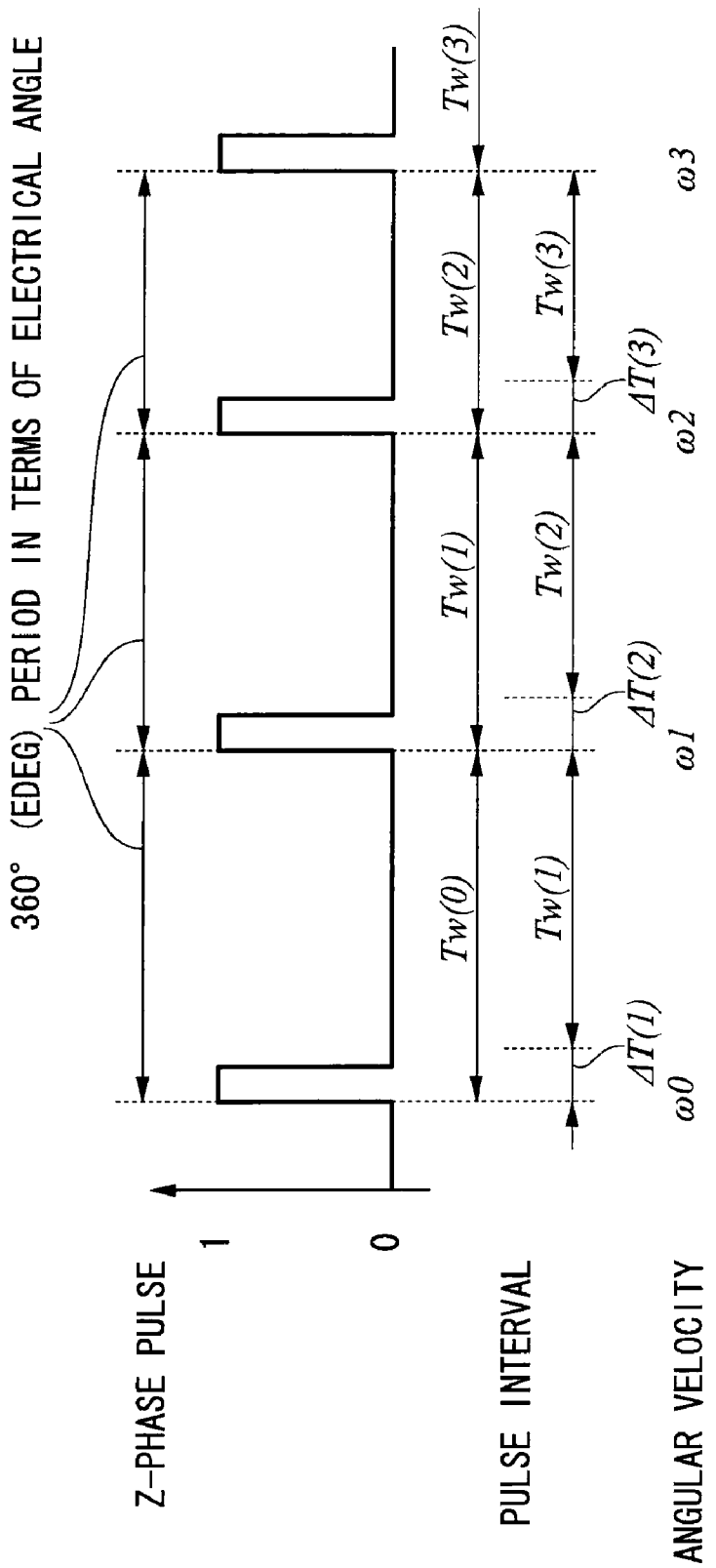
FIG. 13 is a diagram showing one example of the Z-phase pulse according to a modification of the embodiments of the present invention.

For example, in the case where the rotational state of motor M is a rotation of uniform angular acceleration, then, as shown in FIG. 13, the interval between adjacent Z-phase pulses (pulse interval Tw(m), where m is an optional positive integer) on the time series, the pulse which is output from the position sensor 15, constricts in a manner inversely proportional to the increasing angular velocity (angular velocity $\omega_0$, $\omega_1$, $\omega_2$, $\omega_3$, ...).

For example, pulse interval Tw(0) is described analytically by the following equation (10) for example, from equation (9), where ω is the angular velocity, θ is the rotation angle, t is time, and a, $\omega_0$ are specified coefficients.

$$\left. \begin{aligned} \dot{\omega} &= a \\ \omega &= a \cdot t + \omega_0 \\ \theta &= \frac{1}{2} a \cdot t^2 + \omega_0 \cdot t \\ \frac{1}{2} a \cdot R &= Tw(0)^2 + \omega_0 \cdot Tw(0) = \pi \end{aligned} \right\} (9) \quad \text{[Equation 9]}$$

$$Tw(0) = \frac{-\omega_0 + \sqrt{\omega_0^2 + 2\pi \cdot a}}{a} \quad \text{[Equation 10]}$$

However, the calculation load increases excessively when calculating the analytical solution for the respective pulse intervals Tw(m) (where m is an optional positive integer).

For this reason, it is acceptable for synchronous controller 31 to estimate an estimated rotational period of the motor M by assuming that the intervals between adjacent pulses on a time series do not change (i.e., difference Δt(n)=0, where n is an optional natural number), as shown in the following equation (11) for example.

$$\Delta T(n) = 0 \quad \text{[Equation 11]}$$

Further, it is acceptable for synchronous controller 31 to estimate an estimated rotational period of the motor M by assuming that the amount of change in the intervals between adjacent pulses on a time series is a specified amount, as shown in the following equation (12) for example.

$$\Delta T(n) = \Delta T(n-1) \quad \text{[Equation 12]}$$

Further, it is acceptable for synchronous controller 31 to estimate an estimated rotational period of the motor M by assuming that the amount of change in the intervals between adjacent pulses on a time series changes in accordance with a specified ratio k, as shown in the following equation (13) for example.

$$\Delta T(n) = k \cdot \Delta T(n-1) = \frac{\Delta T(n-1)}{\Delta T(n-2)} \Delta T(n-1) \quad \text{[Equation 13]}$$

Further, it is acceptable for synchronous controller 31 to estimate an estimated rotational period of the motor M by assuming that the interval between adjacent pulses on a time series changes in accordance with a specific ratio, as shown in the following equation (14) for example.

$$Tw(n) = Tw(n-1) \times \frac{Tw(n-1)}{Tw(n-2)} \quad \text{[Equation 14]}$$

In these embodiments, it is not necessary to carry out complicated analysis processing, even when the angular velocity relating to the rotation angle of the motor M is changing, and it is possible to suitably execute synchronous control based on a highly precise estimated rotational period.

Figure 14:
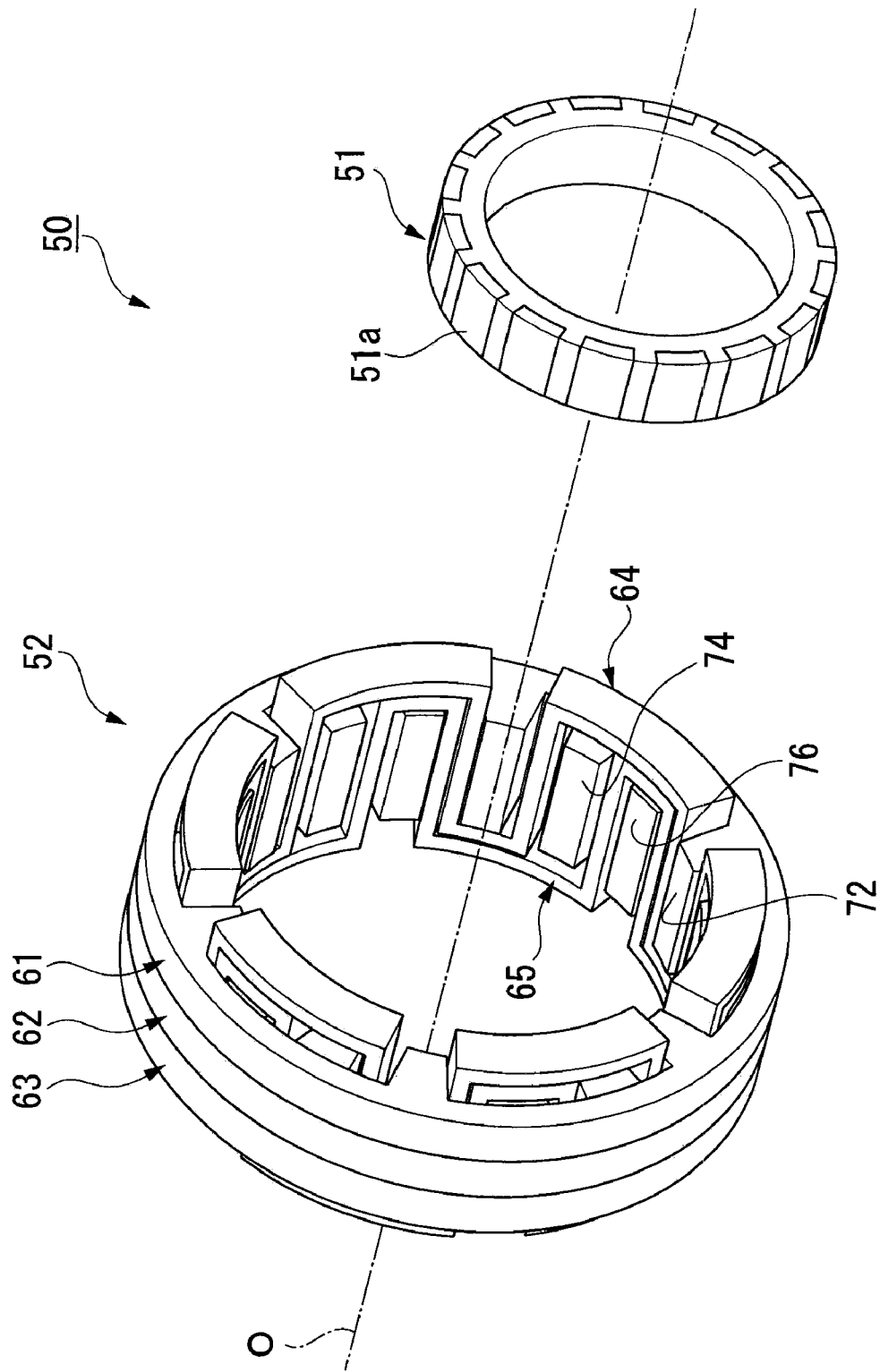
FIG. 14 is a disassembled diagonal perspective of a claw pole type motor according to a modification of the embodiments of the present invention.
Figure 15:
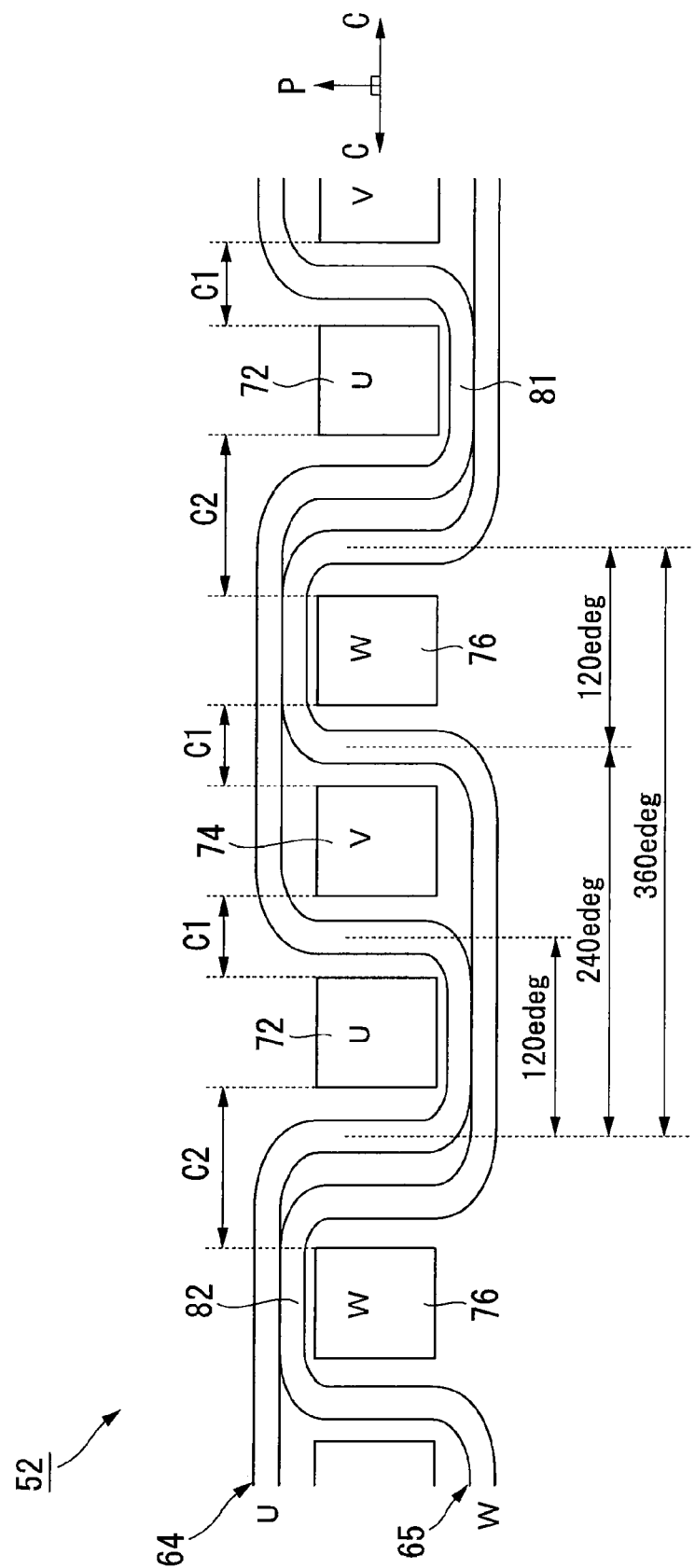
FIG. 15 is a radial cross-sectional view of the essential components of the stator in a claw pole type motor according to a modification of the embodiments of the present invention.
Figure 16:
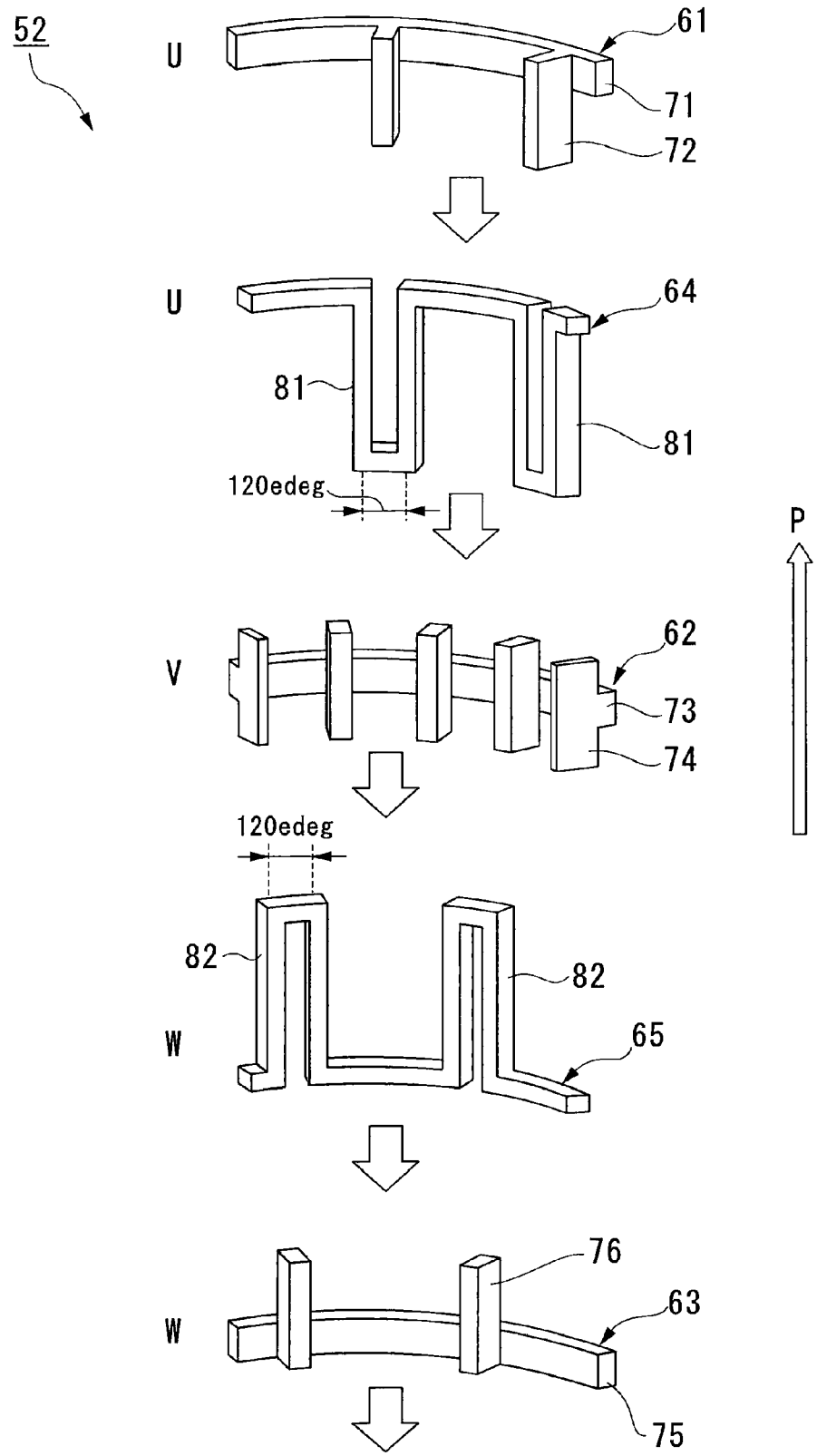
FIG. 16 is a disassembled diagonal perspective of an essential component of the stator in a claw pole type motor according to a modification of the embodiments of the present invention.

Note that motor M is not particularly restricted in the preceding embodiments, and may be, for example, a claw pole type motor, or the like, such as shown in FIGS. 14 through 16.

This claw pole type motor 50 is provided with a rotor 51 having a plurality of permanent magnets 51a, . . . , 51a, and a multiphase (U-phase, V-phase, W-phase of three phases, for example) stator 52 that generates a rotating magnetic field for rotating the rotor 51.

In this rotor 51, a plurality of approximately rectangular, plate-shaped permanent magnets 51a, . . . , 51a are disposed at a specified interval in the circumferential direction on the outer circumferential surface of the rotor 51, for example. The permanent magnets are magnetized in its thickness direction (i.e., in the radial direction of rotor 51) with the magnetization directions of the permanent magnets adjacent in the circumferential direction disposed so as to be reversed between adjacent magnets. That is, a permanent magnet 51a whose outer circumferential side serves as an N-pole is adjacent to another permanent magnet 51a whose outer circumferential side serves as an S-pole.

The outer circumferential surface of each permanent magnet 51a is exposed to the inner circumferential surface of the tube-shaped stator 52 which is disposed opposing the outer circumferential of the rotor 51.

The stator 52, which generates a rotating magnetic field for rotating a rotor 51, is provided with a U-phase stator ring 61, a V-phase stator ring 62, and a W-phase stator ring 63 for the respective A, B, and C phases, and a U-phase annular coil 64 and a W-phase annular coil 65 for the respective U and W phases.

As shown in FIG. 16 for example, the U-phase stator ring 61 is provided with a ring-shaped U-phase yoke 71 and U-phase teeth 72. The U-phase teeth 72 project inward in the radical direction R from positions spaced at a specified interval in the circumferential direction C on the inner circumferential side of the U-phase yoke 71, and project toward the other direction along the axial direction P, with the cross-sectional shape in the radical direction R being substantially rectangular. The U-phase stator ring 61 consisting of the U-phase yoke 71 and U-phase teeth 72 is formed so that its cross-sectional shape in the circumferential direction C is L-shaped.

As shown in FIG. 16 for example, the V-phase stator ring 62 is provided with a ring-shaped V-phase yoke 73 and V-phase teeth 74. The V-phase teeth 74 project inward in the radical direction R from positions spaced at a specified interval in the circumferential direction C on the inner circumferential side of the V-phase yoke 73, and project toward one and the other directions along the axial direction P, with the cross-sectional shape in the radical direction R being substantially rectangular. The V-phase stator ring 62 consisting of the V-phase yoke 73 and V-phase teeth 74 is formed so that its cross-sectional shape in the circumferential direction C is T-shaped.

As shown in FIG. 16 for example, the W-phase stator ring 63 is provided with a ring-shaped W-phase yoke 75 and W-phase teeth 76. The W-phase teeth 76 project inward in the radical direction R from positions spaced at a specified interval in the circumferential direction C on the inner circumferential side of the W-phase yoke 75, and project toward one direction along the axial direction P, with the cross-sectional shape in the radical direction R being substantially rectangular. The W-phase stator ring 63 consisting of the W-phase yoke 75 and W-phase teeth 76 is formed so that its cross-sectional shape in the circumferential direction C is L-shaped.

The stator rings 61, 62, 63 are connected so that the yokes 71, 73, 75 are superimposed along the axial direction P. Further, as shown in FIG. 15 for example, the plurality of teeth 72, . . . 72; 74, . . . 74; 76, . . . 76 are arranged in the circumferential direction C in a specified order (for example, in the order of U-phase tooth 72, V-phase tooth 74, W-phase tooth 76, etc.). Slots where single phase of the U-phase annular coil 74 is to be disposed are formed between the teeth 72 and 74 that are adjacent in the circumferential direction C. Slots where single phase of the W-phase annular coil 65 is to be disposed are formed between the teeth 74 and 76 that are adjacent in the circumferential direction C. Slots where two phases of the U-phase annular coil 64 and W-phase annular coil 65 are to be disposed are formed between the teeth 72 and 76 that are adjacent in the circumferential direction C.

The respective teeth 72, 74, and 76 of the respective stator rings 61, 62, and 63 have identical widths in the axial direction and the circumferential direction, for example. The interval between the respective teeth 72, 74, and 76 adjacent in the circumferential direction C (that is, the width in the circumferential direction of the respective slots) is set to a value corresponding to the number of annular coils 64 and 65 disposed in the slots (for example, a value proportional to the number of coils). In other words, the interval C1 between the teeth 72 and 74 and between the teeth 74 and 76 in which the annular coils 64 and 65 are singly disposed is set to a value less than an interval C2 between the teeth 72 and 76 in which both annular coils 314 and 315 of two phases are disposed (for example, ½ of the interval C2 between the teeth 72 and 76).

The annular coils 64 and 65 surround the circumference around the axis while meandering in a crank shape within the circumferential surface, to be thereby provided with a plurality of U-phase meandering portions 81 and W-phase meandering portions 82, respectively.

The width of the meandering portions 81 and 82 in the circumferential direction C, that is, the coil pitch, is set to an electrical angle of 120°, as shown, for example, in FIG. 14. The meandering portions 81 and 82 are configured to project in mutually different directions (that is, the one side and the other side along the axis P, which are mutually opposing directions). The U-phase annular coil 64 and the W-phase annular coil 65 are disposed at relatively shifted positions along the circumferential direction C so as to have a phase difference of 240° (edeg) in terms of electrical angle. Thereby, with respect to the U-phase meandering portion 81, the W-phase meandering portion 82 that is adjacent on the one side in the circumferential direction C has a phase difference of 240° (edeg) in terms of electrical angle, and the W-phase meandering portion 82 that is adjacent on the other side in the circumferential direction C has a phase difference of 120° (edeg) in terms of electrical angle. The meandering portions 81 and 82, which project in mutually opposite directions, are alternately arranged along the circumferential direction C so that the annular coils 64 and 65 of the two phases are disposed so as not to mutually cross.

One U-phase tooth 72 of the U-phase stator ring 61 is disposed in U-phase meandering portion 81 of the U-phase annular coil 64. One W-phase tooth 76 of the W-phase stator ring 63 is disposed in W-phase meandering portion 82 of the W-phase annular coil 65. One V-phase tooth 74 of the V-phase stator ring 62 is disposed between U-phase meandering portion 81 and W-phase meandering portion 82 that are adjacent in the circumferential direction C.

Thereby, the annular coils 64 and 65 of two phases, which are disposed so as to weave between the teeth 72 and 74, between the teeth 74 and 76, or between the teeth 72 and 76 adjacent in the circumferential direction C, are formed so as to have so-called short-pitch wave windings of not more than 120° (edeg) in terms of electrical angle.

Figure 17A:
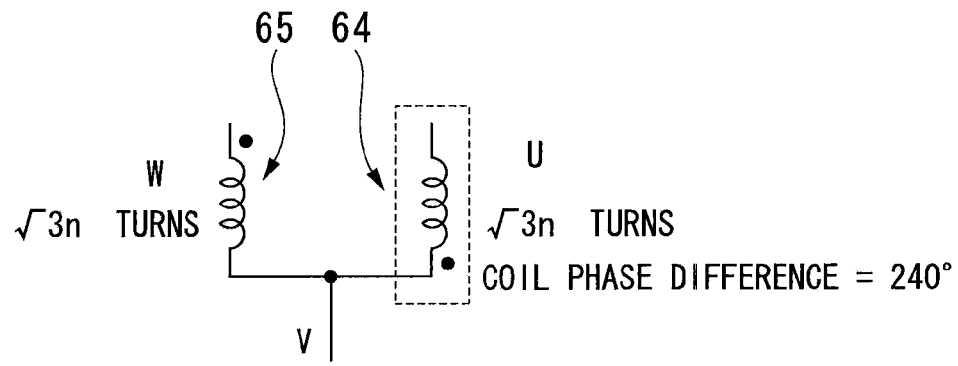
FIG. 17A is a diagram showing the connection state of the respective annular coils of the stator in the claw pole type motor shown in FIG. 14.

The annular coils 64 and 65 of two phases having a phase difference (coil phase difference) of 240° (edeg) in terms of electrical angle are, as shown in FIG. 17A for example, connected in a V-shape, and energized with sinusoidal waves having a mutual phase difference of 120°. Thereby, for example, when leakage flux can be disregarded, as shown in FIG. 17C, a rotating magnetic field is produced similar to that of a three-phase stator having three-phase coils of, U, V, and W phases are connected in a Y-shape and energized by sinusoidal waves with a mutual phase difference of 120°.

Figure 17B:
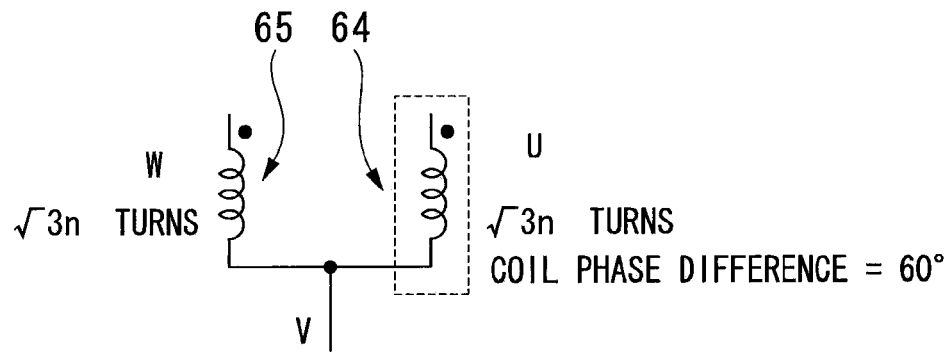
FIG. 17B is a diagram showing the connection state of the respective annular coils of the stator in the claw pole type motor shown in FIG. 14.
Figure 17C:
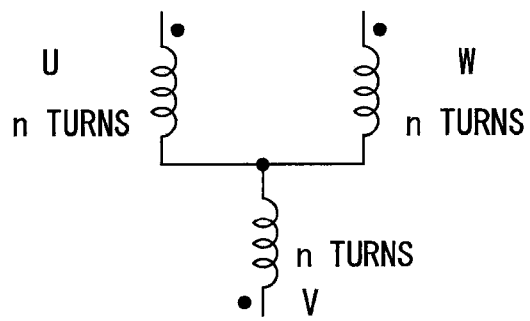
FIG. 17C is a diagram showing the connection state of the respective annular coils of a three-phase (U-phase, V-phase and W-phase) stator.

When connecting the annular coils 64 and 65 of two phases having a phase difference of 60° (edeg) in terms of electrical angle in a V-shape with their meandering portions 81 and 82 projecting in the same direction (that is, the one direction or the other direction along the axial direction P) as shown, for example, in FIG. 17B, similarly to connecting the annular coils 64 and 65 of two phases having a phase difference of 240° (edeg) in terms of electrical angle in a V-shape with their meandering portions 81 and 82 projecting in mutually different directions (that is, the one direction and the other direction along the axial direction P) as shown in FIG. 17A, in the case of being energized with sinusoidal waves having a mutual phase difference of 120°, for example, when leakage flux can be disregarded, as shown in FIG. 17C, a rotating magnetic field can be produced similarly to that of a three-phase stator in which its coils of U, V, and W phases are connected in a Y-shape and energized by sinusoidal waves with a mutual phase difference of 120°.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A motor control apparatus, comprising:
    an inverter for successively commutating the current to a motor using a pulse width modulation signal;
    a pulse width modulation signal generating device for generating the pulse width modulation signal using a carrier signal of variable frequency and phase;
    a rotational state quantity sensor for detecting a rotational state quantity relating to a rotational period of the motor;
    a phase difference detecting device for detecting the phase difference between the carrier signal and the rotational period based on the rotational state quantity;
    a frequency setting device for setting a frequency of the carrier signal to a value in accordance with a multiplier for one period in terms of electrical angle of the rotational period of the motor, based on the multiplier which changes in accordance with revolutions of the motor, when the rotational frequency of the motor is equal to or greater than a specified frequency and the phase difference is equal to or less than a specified value; and
    a synchronizing device for synchronizing a control period of the carrier signal to the rotational period of the motor.

2. A motor control apparatus according to claim 1, wherein the frequency setting device and the synchronizing device are capable of setting a specific phase difference between the control period and the rotational period of the motor.

3. A motor control apparatus according to claim 1, further comprising:
    a current sensor capable of detecting the current flowing through the motor in accordance with the control period; and
    a current controlling device for carrying out the current control of the motor based on an average value of the current values detected by the current sensor over a specific period relating to the rotational period of the motor.

4. A motor control apparatus according to claim 1, wherein the rotational state quantity sensor outputs a signal synchronized with the rotational period of the motor.

5. A motor control apparatus according to claim 1, further comprising a prohibiting device for prohibiting synchronization of the control period with the rotational period of the motor by the synchronizing device when the control period is less than a specific lower limit period and the multiplier is less than a specific lower limit value.

6. A motor control apparatus according to claim 1, wherein the frequency setting device increases the multiplier when the control period is equal to or greater than a specific upper limit period, and decreases the multiplier when the control period is less then a specific lower limit period and the multiplier is equal to or greater than a specific lower limit value.

7. A motor control apparatus according to claim 1, wherein the frequency setting device sets a period Tc of the carrier signal according to the equation (Tc=(T−k×Δt)/N), where T is one period in terms of electrical angle of the rotational period of the motor, k is a specified coefficient which is equal to or less than one but greater than zero, Δt is the phase difference, and N is the multiplier.

8. A motor control apparatus according to claim 1, wherein:
    the rotational state quantity sensor is provided with an angle sensor for outputting a pulse in accordance with the rotation angle of the motor; and
    the motor control apparatus is provided with an approximating device which estimates an estimated rotational period of the motor by assuming that the interval between adjacent the pulses on a time series does not change in the case where there is variation in the angular velocity relating to the rotation angle, and sets the estimated rotational period as the rotational period.

9. A motor control apparatus according to claim 1, wherein:
    the rotational state quantity sensor is provided with an angle sensor for outputting the pulse in accordance with the rotation angle of the motor; and
    the motor control apparatus is provided with an approximating device which estimates an estimated rotational period of the motor by assuming that the amount of change in the interval between adjacent the pulses on a time series is a specific amount in the case where there is variation in the angular velocity relating to the rotation angle, and sets the estimated rotational period as the rotational period.

10. A motor control apparatus according to claim 1, wherein:
    the rotational state quantity sensor is provided with an angle sensor for outputting a pulse in accordance with the rotation angle of the motor; and
    the motor control apparatus is provided with an approximating device which estimates an estimated rotational period of the motor by assuming that the amount of change in the interval between adjacent the pulses in a time series is changing in accordance with a specific ratio in the case where there is variation in the angular velocity relating to the rotation angle, and sets the estimated rotational period as the rotational period.

11. A motor control apparatus according to claim 1, wherein:
   the rotational state quantity sensor is provided with an angle sensor for outputting the pulse in accordance with the rotation angle of the motor; and
   the motor control apparatus is provided with an approximating device which estimates an estimated rotational period of the motor by assuming that the interval between adjacent the pulses in a time series is changing in accordance with a specific ratio in the case where there is variation in the angular velocity relating to the rotation angle, and sets the estimated rotational period as the rotational period.

12. A motor control apparatus according to claim 1, wherein the motor is a claw pole type motor comprising a rotor which has a permanent magnet; and a stator which has multiphase annular coils and multiphase claw induction poles that are opposingly disposed to the stator in the radial direction and which are arrayed in the circumferential direction.

* * * * *